United States Patent
Cox

(10) Patent No.: US 10,839,280 B2
(45) Date of Patent: *Nov. 17, 2020

(54) SELF-CENTERED INLAY AND CORE LAYER FOR INFORMATION CARRYING CARD, PROCESS AND RESULTING PRODUCTS

(71) Applicant: X-Card Holdings, LLC, West Chester, PA (US)

(72) Inventor: Mark A. Cox, West Chester, PA (US)

(73) Assignee: X-Card Holdings, LLC, West Chester, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/421,614

(22) Filed: May 24, 2019

(65) Prior Publication Data

US 2019/0279065 A1    Sep. 12, 2019

Related U.S. Application Data

(63) Continuation of application No. 15/746,267, filed as application No. PCT/US2015/050944 on Sep. 18, 2015, now Pat. No. 10,339,434.

(51) Int. Cl.
*G06K 19/077* (2006.01)
*B32B 3/08* (2006.01)
(Continued)

(52) U.S. Cl.
CPC .......... *G06K 19/07722* (2013.01); *B32B 3/08* (2013.01); *B32B 3/18* (2013.01);
(Continued)

(58) Field of Classification Search
CPC ......... G06K 19/07722; G06K 19/0772; G06K 19/07745; B32B 3/08; B32B 3/10; B32B 3/18; B32B 3/26
See application file for complete search history.

(56) References Cited

U.S. PATENT DOCUMENTS 3,836,414 A * 9/1974 Staats ..................... B32B 27/00
156/87
4,792,843 A * 12/1988 Haghiri-Tehrani .........................
G06K 19/07745
257/679

(Continued)

FOREIGN PATENT DOCUMENTS

EP    0488574 A2    11/1991

OTHER PUBLICATIONS

Extended European Search Report issued in connection with European Patent Application No. 15904272.0, dated Mar. 7, 2019, 8 pages.

(Continued)

*Primary Examiner* — Daniel I Walsh
(74) *Attorney, Agent, or Firm* — Duane Morris LLP

(57) ABSTRACT

The disclosure provides a method for forming a core layer for at least one information carrying card, and resulting products. The method includes forming an inlay layout, and dispensing a crosslinkable polymer composition over the inlay layout and contacting the inlay layer so as to form the core layer of the information carrying card. The inlay layout includes at least one inlay layer coupled with a first thermoplastic layer. The first thermoplastic layer comprises a thermoplastic material, and defines at least one hole therein. The at least one inlay layer is disposed at least partially inside a respective hole.

20 Claims, 16 Drawing Sheets

(51) Int. Cl.
| | |
|---|---|
| *B32B 3/18* | (2006.01) |
| *B32B 3/26* | (2006.01) |
| *B32B 7/06* | (2019.01) |
| *B32B 27/08* | (2006.01) |
| *B32B 27/16* | (2006.01) |
| *B32B 27/30* | (2006.01) |
| *B32B 27/32* | (2006.01) |
| *B32B 27/34* | (2006.01) |
| *B32B 27/36* | (2006.01) |
| *B32B 37/10* | (2006.01) |

(52) U.S. Cl.
CPC ............... *B32B 3/266* (2013.01); *B32B 7/06* (2013.01); *B32B 27/08* (2013.01); *B32B 27/16* (2013.01); *B32B 27/302* (2013.01); *B32B 27/304* (2013.01); *B32B 27/32* (2013.01); *B32B 27/34* (2013.01); *B32B 27/36* (2013.01); *B32B 27/365* (2013.01); *B32B 37/1018* (2013.01); *G06K 19/07724* (2013.01); *B32B 2250/05* (2013.01); *B32B 2250/24* (2013.01); *B32B 2250/40* (2013.01); *B32B 2307/412* (2013.01); *B32B 2307/58* (2013.01); *B32B 2307/748* (2013.01); *B32B 2307/75* (2013.01); *B32B 2425/00* (2013.01)

(56) References Cited

U.S. PATENT DOCUMENTS

| | | | | |
|---|---|---|---|---|
| 4,907,061 | A * | 3/1990 | Kohara | H01L 23/49572 257/679 |
| 6,025,054 | A * | 2/2000 | Tiffany, III | G06K 19/02 235/487 |
| 6,256,873 | B1 * | 7/2001 | Tiffany, III | B29C 45/14647 29/827 |
| 8,608,080 | B2 * | 12/2013 | Finn | B32B 37/1207 235/492 |
| 8,881,373 | B1 | 11/2014 | Koepp et al. | |
| 10,040,308 | B2 * | 8/2018 | Droz | B42D 15/027 |
| 10,339,434 | B2 * | 7/2019 | Cox | B32B 27/16 |
| 2003/0012926 | A1 | 1/2003 | Murari et al. | |
| 2004/0159709 | A1 * | 8/2004 | Ohta | G06K 19/07749 235/492 |
| 2006/0010685 | A1 * | 1/2006 | Kobayashi | H01L 24/19 29/825 |
| 2006/0226240 | A1 | 10/2006 | Singleton | |
| 2006/0273898 | A1 | 12/2006 | Hagiwara | |
| 2007/0136211 | A1 | 6/2007 | Brown et al. | |
| 2008/0150817 | A1 * | 6/2008 | Carre | H01Q 1/38 343/741 |
| 2009/0315320 | A1 | 12/2009 | Finn | |
| 2010/0085718 | A1 * | 4/2010 | Sakurai | B32B 27/16 361/761 |
| 2010/0276919 | A1 | 11/2010 | Dietemann | |
| 2011/0011939 | A1 | 1/2011 | Seah | |
| 2011/0154662 | A1 * | 6/2011 | Droz | G06K 19/077 29/846 |
| 2011/0169146 | A1 | 7/2011 | Ohira et al. | |
| 2011/0186980 | A1 * | 8/2011 | Lin | H01Q 1/2225 257/690 |
| 2012/0012659 | A1 * | 1/2012 | Sugimoto | E05B 19/046 235/492 |
| 2013/0255078 | A1 * | 10/2013 | Cox | B32B 3/08 29/830 |
| 2013/0255848 | A1 * | 10/2013 | Cox | G06K 19/07722 156/60 |
| 2014/0021261 | A1 * | 1/2014 | Mosteller | G06K 19/02 235/488 |
| 2015/0014418 | A1 | 1/2015 | Ponikwar et al. | |
| 2015/0235122 | A1 | 8/2015 | Finn et al. | |
| 2016/0203399 | A1 * | 7/2016 | Cox | B29C 43/36 156/275.5 |
| 2017/0243104 | A1 * | 8/2017 | Cox | G06K 19/07722 |
| 2017/0262749 | A1 * | 9/2017 | Cox | B32B 7/06 |
| 2018/0211147 | A1 * | 7/2018 | Cox | B32B 3/266 |
| 2019/0204812 | A1 * | 7/2019 | Cox | B42D 25/305 |
| 2019/0279065 | A1 * | 9/2019 | Cox | B32B 7/06 |

OTHER PUBLICATIONS

Office Action issued in connection with Canadian Patent Application No. 2,995,928, dated Jan. 29, 2019, 4 pages.

International Search Report and Written Opinion issued for International patent application No. PCT/US2015/050944, dated Jun. 17, 2016, 13 pages.

* cited by examiner

SELF-CENTERED INLAY AND CORE LAYER FOR INFORMATION CARRYING CARD, PROCESS AND RESULTING PRODUCTS

RELATED APPLICATIONS

This application is a continuation of U.S. patent application Ser. No. 15/746,267, filed Jan. 19, 2018 which is national phase entry under 35 U.S.C. 371 of international patent application No. PCT/US2015/050944, filed Sep. 18, 2015, the entireties of which are incorporated herein by reference.

The disclosure relates to the materials disclosed in the following applications and the applications based on the following applications, which applications are incorporated by reference in their entirety as if set forth fully herein:

(1) U.S. patent application Ser. No. 13/801,630, filed Mar. 13, 2013;

(2) U.S. patent application Ser. No. 13/801,677, filed Mar. 13, 2013;

(3) International Application No. PCT/US2014/021548, filed Mar. 7, 2014; and (4) International Application No. PCT/US2014/50987, filed Aug. 14, 2014.

FIELD OF THE INVENTION

The disclosure relates to information carrying cards such as smart cards. More particularly, the disclosed subject matter relates to a method of making an core layer for an information carrying card, and the resulting core layer and the information carrying cards.

BACKGROUND OF THE INVENTION

Information carrying cards provide identification, authentication, data storage and application processing. Such cards or parts include key cards, identification cards, telephone cards, credit cards, bankcards, tags, bar code strips, other smart cards and the like. Counterfeiting and information fraud associated with traditional plastic cards causes tens of billions of dollars in the losses each year. As a response, information carrying cards are getting "smarter" to enhance security. Smart card technologies provide solutions to prevent fraud and decrease resulting losses.

Information carrying cards often include an integrated circuit (IC) embedded in a thermoplastic material, such as polyvinyl chloride (PVC). Information has been input and stored in the integrated circuit before a transaction. In use, information carrying cards work in either a "contact" or "contactless" mode. In contact mode, an electronic component on the card is caused to directly contact a card reader or other information receiving device to establish an electromagnetic coupling. In contactless mode, the electromagnetic coupling between the card and the card reading device is established through electromagnetic action at a distance, without the need for physical contact. The process of inputting information into the IC of the information carrying card also works in either of these two modes.

When information carrying cards become "smarter," the amount of information stored in each card often increases, and the complexity of the embedded IC's also increases. The cards also need to withstand flexing to protect sensitive electronic components from damage as well as offer good durability during use. A relatively easy and full-scale commercial process having improved productivity at low cost is also desired.

SUMMARY OF THE INVENTION

The invention provides a core layer for an information carrying card comprising a self-centering inlay layout or design, the process of making the core layer, and the resulting products. The core layer also comprises a crosslinked polymer composition, and the self-centering inlay layout is suitable for fabrication of a core layer through a thermal lamination process.

In some embodiments, a method for forming a core layer for at least one information carrying card comprises the steps of forming an inlay layout comprising at least one inlay layer coupled with a first thermoplastic layer, dispensing a crosslinkable polymer composition over the inlay layout and contacting the inlay layer so as to form the core layer of the information carrying card. The first thermoplastic layer comprises a thermoplastic material, and defines at least one hole therein (or therethrough). The at least one inlay layer is disposed at least partially inside a respective hole. The step of forming the inlay layout may comprise the steps of providing the first thermoplastic layer defining the at least one hole therein, disposing the at least one inlay layer at least partially or fully inside a respective hole, and coupling the at least one inlay layer and the first thermoplastic layer (e.g., using an adhesive tape, an adhesive, a solder, or any other suitable chemical or physical technique). In some embodiments, the at least one inlay layer is flexibly coupled to the first thermoplastic layer so as to form a cantilevered structure adjacent to or within a respective hole so as to be suitable for self-centering relative to the edges of the hole, particularly in the presences of a crosslinkable polymer composition during a processing step, for example, during a step of vacuuming and/or heating. Such a process may be performed in a mold.

The method may further comprise one of the following steps: disposing the first thermoplastic layer over a first release film, applying vacuum to the crosslinkable polymer composition, and disposing a second thermoplastic layer or a second release film above the inlay layout after dispensing the crosslinkable polymer composition. The first or second thermoplastic layer may comprise a thermoplastic material selected from the group consisting of polyvinyl chloride, copolymer of vinyl chloride, polyolefin, polycarbonate, polyester, polyamide, and acrylonitrile butadiene styrene copolymer (ABS). The crosslinkable polymer composition comprises: a curable precursor, which may be selected from the group consisting of acrylate, methacrylate, urethane acrylate, silicone acrylate, epoxy acrylate, methacrylate, silicone, urethane and epoxy. The crosslinkable polymer composition is a liquid or a paste, and curable under heat or radiation, or both. The method may further comprise a step of curing the crosslinkable polymer composition to form a crosslinked polymer composition. The curing step may be performed under a pressure using radiation or at a raised temperature, or both radiation and heat. Such a pressure may be equal to or less than 2 MPa, and the raised temperature might be equal to or less than 150° C.

In some embodiments, the at least one inlay layer comprises at least one electronic component. The at least one electronic component is partially or fully located within the respective hole in the first thermoplastic layer. The at least one electronic component in the inlay layer may comprise at least one integrated circuit, at least one light emitting diode (LED) component, or a battery. The inlay layout or the core layer may comprise at least one of a metal sheet (such as stainless steel), a ceramic sheet, a wooden sheet, and carbon fiber based sheet. In some embodiments, the first thermoplastic layer defines a plurality of holes therein (or therethrough), the inlay layout comprises a plurality of inlay layers flexably coupled to the first thermoplastic layer, each inlay layer being located within a respective one of the plurality of holes so as to form a cantilevered structure adjacent to a respective hole and be suitable for self-centering relative to the edges of the hole, particularly in the presences of a crosslinkable polymer composition during a processing step. The resulting core layer is for making a plurality of information carrying cards simultaneously.

In another aspect, a method for fabricating at least one information carrying card is provided that includes forming a core layer as described above. Such a method for making information carrying card may comprise laminating a printable thermoplastic film on one side of the core layer. A printable thermoplastic film may be laminated on each side of the core layer. Such a method may further comprise laminating a transparent thermoplastic film on the printable thermoplastic film on one side of the core layer. A transparent thermoplastic film may be laminated on the printable thermoplastic film on each side of the core layer.

In another aspect, a resulting product is provided that includes a core layer and a final information carrying card. In some embodiments, a core layer for at least one information carrying card comprises at least one thermoplastic layer defining at least one hole therein (or therethrough), an inlay layout comprising at least one inlay layer coupled (e.g., flexibly coupled) to the first thermoplastic layer, and a crosslinked polymer composition disposed over the inlay layout and contacting the inlay layer. In some embodiments, each inlay layer is at least: (i) partially disposed within a respective hole, and/or (ii) partially movable relative to the edges of the first thermoplastic layer that define the hole. The first thermoplastic layer may comprise a thermoplastic material selected from the group consisting of polyvinyl chloride, copolymer of vinyl chloride, polyolefin, polycarbonate, polyester, polyamide, and acrylonitrile butadiene styrene copolymer (ABS). The at least one inlay layer may be flexibly coupled to the first thermoplastic layer, each inlay layer being located so as to form a cantilevered structure adjacent to or within a respective hole and being self-centered relative to the edges of the first thermoplastic layer that defines the hole. The at least one inlay layer comprises at least one electronic component, wherein the at least one electronic component is partially or fully disposed within the edges of the first thermoplastic layer that define the hole. The at least one electronic component of the inlay layer may comprise at least one integrated circuit, at least one light emitting diode (LED) component, communications circuitry, or a battery. The inlay layout or the core layer may comprise at least one of a metal sheet (such as stainless steel), a ceramic sheet, a wooden sheet, and carbon fiber based sheet. The crosslinked polymer composition comprises a base unit selected from the group consisting of acrylate, methacrylate, urethane acrylate, ester acrylate, silicone acrylate, epoxy acrylate, silicone, urethane and epoxy. The base unit comprises urethane acrylate or epoxy in some embodiments. In some embodiments, the first thermoplastic layer defines a plurality of holes therein, the inlay layout comprises a plurality of inlay layers coupled with the first thermoplastic layer, each inlay layer is disposed inside a respective hole of the plurality of holes, and the core layer is configured to be used for making a plurality of information carrying cards.

In some embodiments, an information carrying card comprises the core layer as described above. The information carrying card comprises at least one printable thermoplastic film laminated onto the surface of the inlay layout and the crosslinked polymer composition. The information carrying card may further comprise at least one transparent film laminated onto the surface of the printable thermoplastic film.

BRIEF DESCRIPTION OF THE DRAWINGS

The present invention is best understood from the following detailed description when read in conjunction with the accompanying drawings. It is emphasized that, according to common practice, the various features of the drawings are not necessarily to scale. In some instances, the dimensions of the various features are arbitrarily expanded or reduced for clarity. Like numerals denote like features throughout the specification and the figures.

FIG. 21 is a cross section view of a transparent film.

FIG. 22 is a cross section view of a printable film disposed over the transparent film of FIG. 19.

FIG. 23 is a cross section view of the layer structure after an exemplary core layer is disposed over the two films of FIG. 20.

FIG. 24 is a cross section view of the resulting layer structure after a second printable film is disposed over the layer structure of FIG. 21.

FIG. 25 is a cross section view of the resulting layer structure after a second transparent film is disposed over the layer structure of FIG. 22.

FIG. 26 is a flow chart diagram illustrating an exemplary process of making an exemplary information carrying card.

DETAILED DESCRIPTION OF PREFERRED EMBODIMENTS

Figure 1:
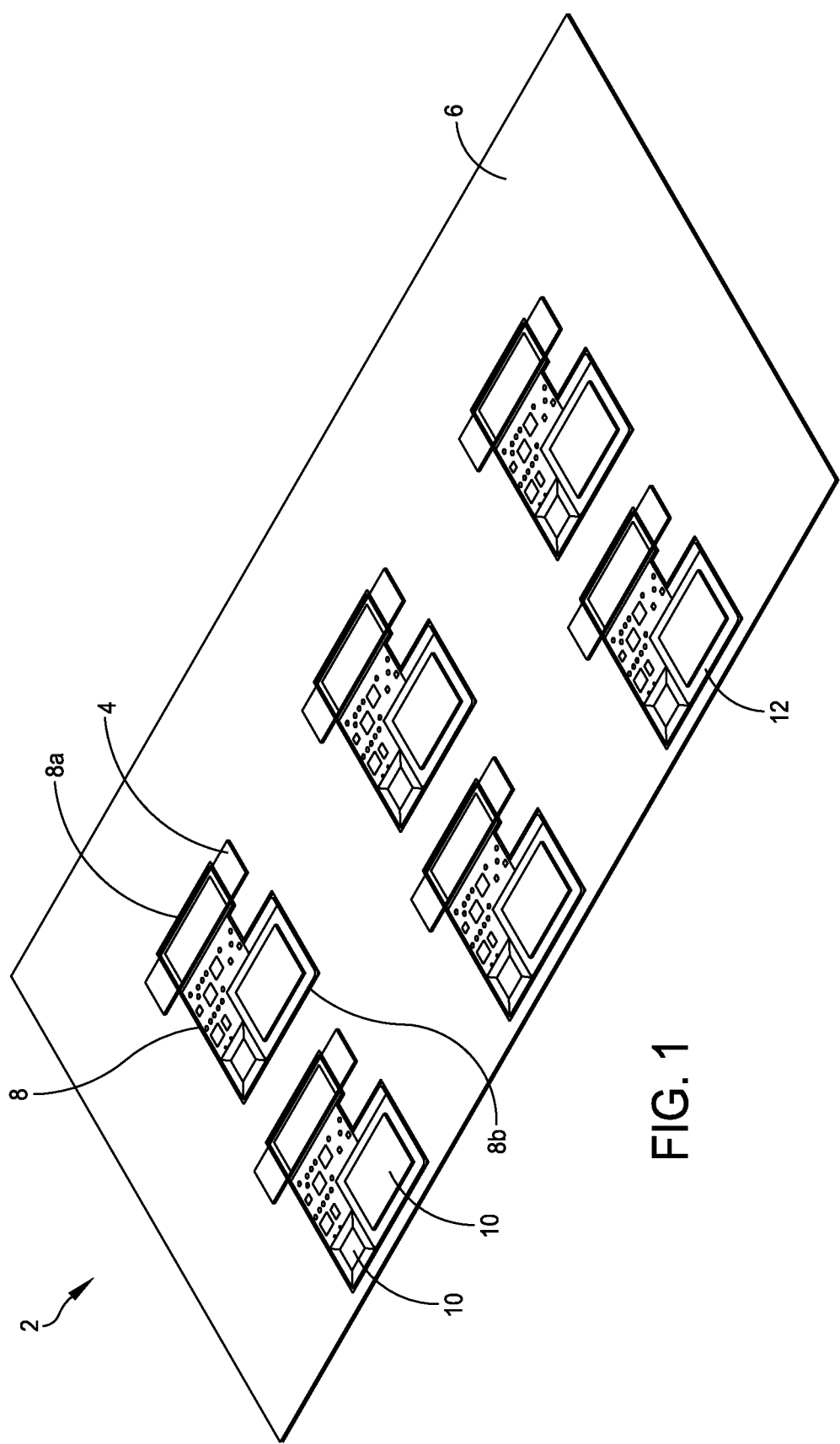
FIG. 1 illustrates an elevation view of an exemplary self-centering inlay layout comprising a plurality of inlay layers coupled with a first thermoplastic layer, in accordance with some embodiments.
Figure 2:
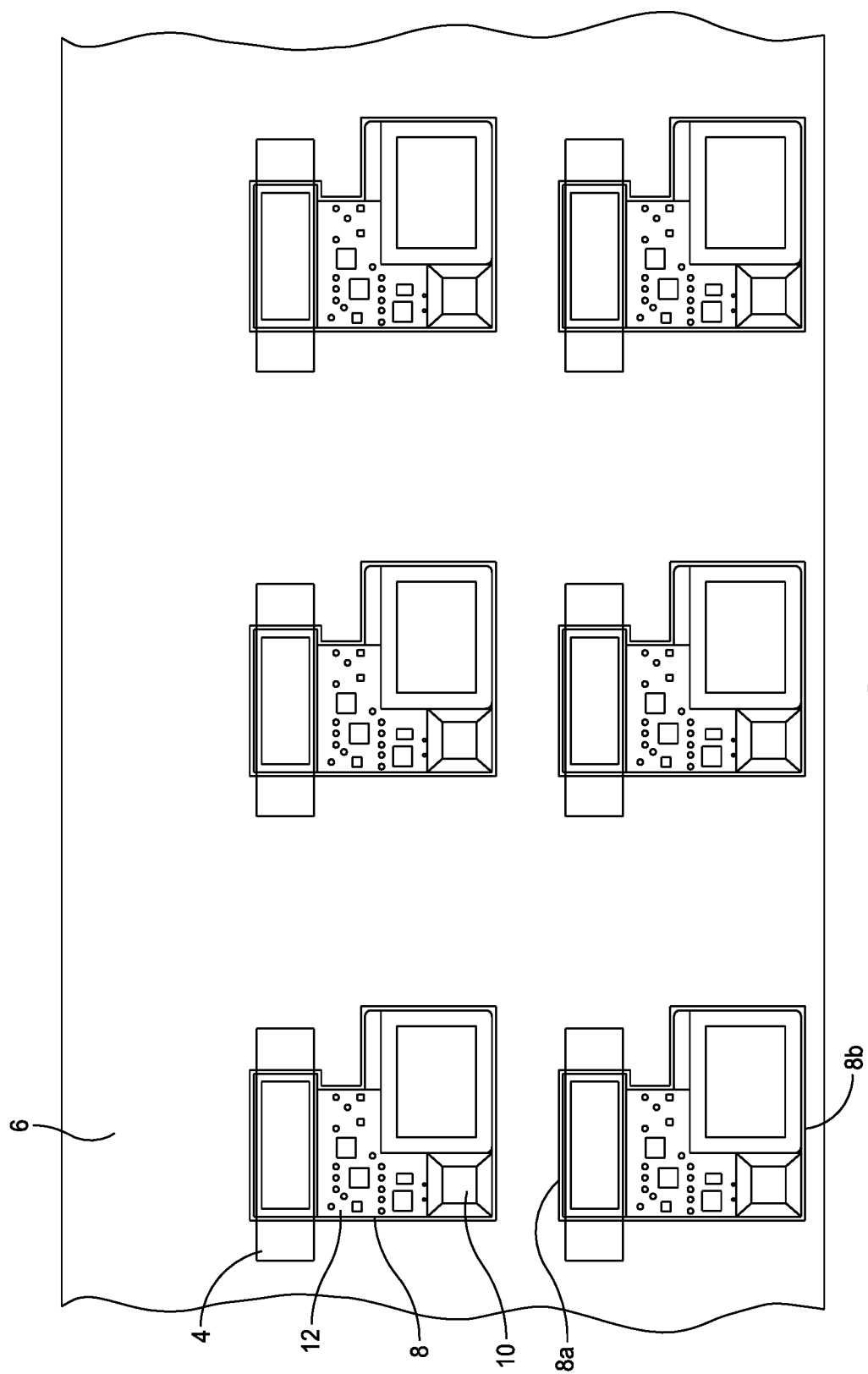
FIG. 2 illustrates a partial plan view of the self-centering inlay layout of FIG. 1.
Figure 3:
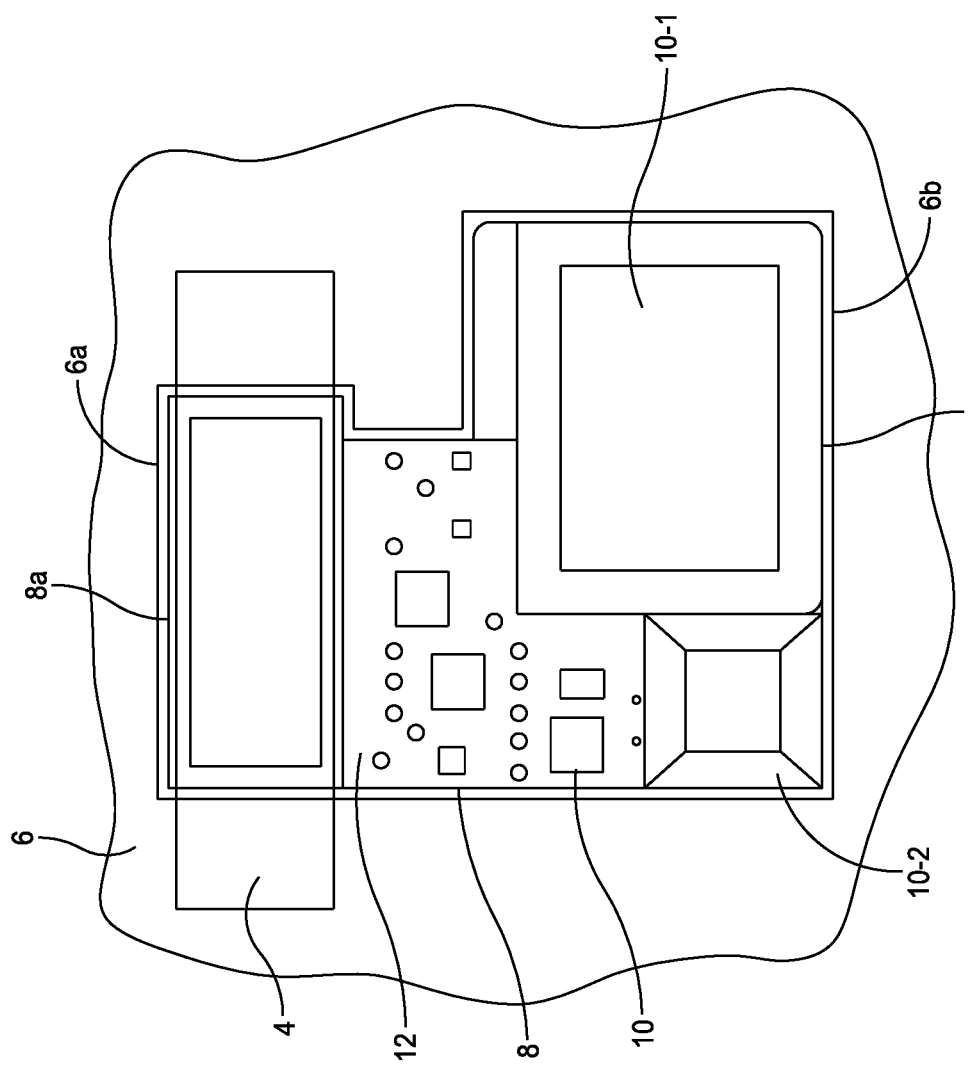
FIG. 3 illustrates a magnified view of the self-centering inlay layout of FIG. 2 showing an inlay layer coupled with the first thermoplastic layer.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that any apparatus to be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

For brevity, unless expressly stated otherwise, references to "information carrying card" or "smart card" made throughout this description are intended to encompass at least key cards, identification cards, telephone cards, credit cards, bankcard, power cards, tags, bar code strips, any part comprising an integrated circuit (IC), and the like. "Information carrying card" or "smart card" also includes a wide variety of shapes, which include but are not limited to rectangular sheets, circular sheets, strips, rods and rings. "Information carrying card" or "smart card" also includes any information carrying parts of both "contact" and "contactless" modes. "Information carrying card" or "smart card" also encompasses any information carrying cards with or without an on-board power supply. An information carrying card comprising a power supply is also referred as a "power card."

The invention provides a core layer for an information carrying card comprising a self-centering inlay layout or design, the process of making the core layer, and the resulting products. The core layer also comprises a cross-linked polymer composition, and the self-centered inlay layout is suitable for fabrication of a core layer through a thermal lamination process.

1. Inlay Layout

Referring to FIGS. 1-12, the present disclosure provides an exemplary inlay layout 2 in accordance with some embodiments.

Referring to FIGS. 1-5, in some embodiments, an exemplary inlay layout 2 comprises a first thermoplastic layer 6, and at least one inlay layer 8 flexibly coupled to the first thermoplastic layer 6. The at least one inlay layer 8 may be coupled to the first thermoplastic layer 6, for example, using a link 4 such as adhesive tape, an adhesive, a solder, or any other suitable chemical or physical means. The coupling may also be performed using an instant adhesive. The composition of the adhesive or adhesive on an adhesive tape may be any suitable material, including but not limited to epoxy, polyurethane, and acrylate. In some embodiments, the first thermoplastic layer 6 comprises a thermoplastic material, that has been cut or otherwise formed so as to yield a plurality of internal edges (e.g., 6a, 6b, 6c, 6d, 6e and other internal edges) that together define at least one hole 7. In many embodiments of the invention, a plurality of internal edges (e.g., 6a to 6b) define an array of holes 7 within first thermoplastic layer 6. A first portion 8a of the at least one inlay layer 8 is positioned at least partially or fully within a respective hole 7 with a second portion 8b securely coupled to a support edge 6a of first thermoplastic layer 6 so that inlay layer 8 is cantilevered to first thermoplastic layer 6. In this way each, cantilevered inlay 8 is free to move, relative to edges 6b and through a respective hole 7. This structural arrangement allows cantilevered inlay 8 to be self-centering in the presence of crosslinkable polymer composition 16 during a processing step as described herein, for example, during a step of vacuuming and/or heating. Advantageously, during processing steps that entail the application of a vacuum or heat, cantilevered inlay 8 is able to oscillate about support edge 6a and between positions that may be above internal edges 6b, 6c, 6d and 6e of first thermoplastic layer 6 or below internal edges 6b, 6c, 6d and 6e thus allowing gases and the like that are volatilized by the lowered pressure or increased temperature, to pass freely across holes 7 without being trapped or suffering undue impedance from cantilevered inlay 8.

Referring to FIGS. 13-14 and 4-6, the step of forming inlay layout 2 (step 22 of FIG. 13) may comprise the steps 32, 34, and 36. At step 32, the first thermoplastic layer 6 defining the at least one hole 7 therein (or therethrough) is provided. At step 34, the at least one inlay layer 8 is at least partially or fully disposed within a respective hole 7. At step 36, the at least one inlay layer 8 is coupled with the first thermoplastic layer 6 (e.g., using a link 4 such as a tape having adhesive). An instant adhesive, a solder, any other suitable material or method, or the like can be used to couple inlay layer 8 with the first thermoplastic layer 6. Examples of an instant adhesive include but are not limited to cyanoacrylate.

First thermoplastic layer 6 can be molded or laminated from one or more layers of thermoplastic films. Examples of materials that are suitable for use in forming first thermoplastic layer 6 include polyvinyl chloride (PVC), a copolymer of vinyl chloride, polyolefin, polycarbonate, polyester, polyamide, acrylonitrile butadiene styrene copolymer (ABS), and the like. The first thermoplastic layer 6 may be a PVC, or a copolymer of vinyl chloride and another monomer such as vinyl ether, vinyl ester or vinyl acetate, or a compound or blend of PVC and a vinyl chloride polymer. Examples of PVC films suitable for use with the invention are available from suppliers such as Klockner Pentaplast of America, Inc. of Gordonsville, Va.; and Shijiazhuang Eurochem Co. Ltd of China. Examples of such copolymer resins are available from Dow Chemical Company under trade name of UCAR®, and from BASF of Ludwigshafen, Germany under trade name of Laroflex®. UCAR® is a copolymer of vinyl chloride and vinyl acetate. The grades include YYNS-3, VYHE1 and VYHD. Laroflex® is a copolymer of vinyl chloride and vinyl isobutyl ether. The grades include MP25, MP 35, MP45 and MP60. All of these polymer resins may be supplied as fine powder. A powder of these copolymers can be added to modify PVC resins for films. First thermoplastic layer 6 having at least one hole can be formed by die-cutting one or more thermoplastic film. Examples of a polyolefin based film may be TESLIN® product, available from PPG Industries.

Figure 4:
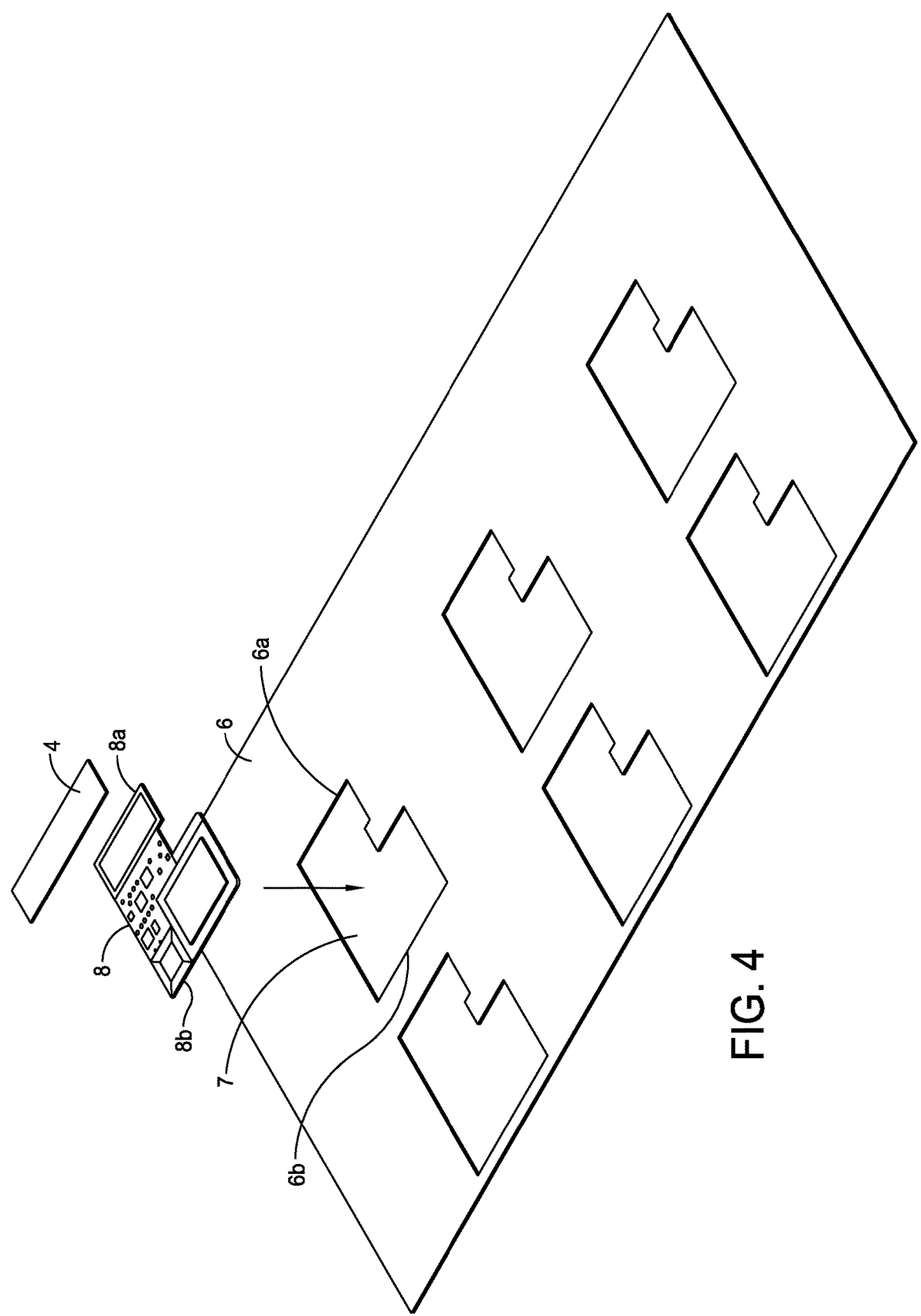
FIG. 4 is an exploded view illustrating the method for coupling one inlay layer with a first thermoplastic layer, in accordance with some embodiments.
Figure 5:
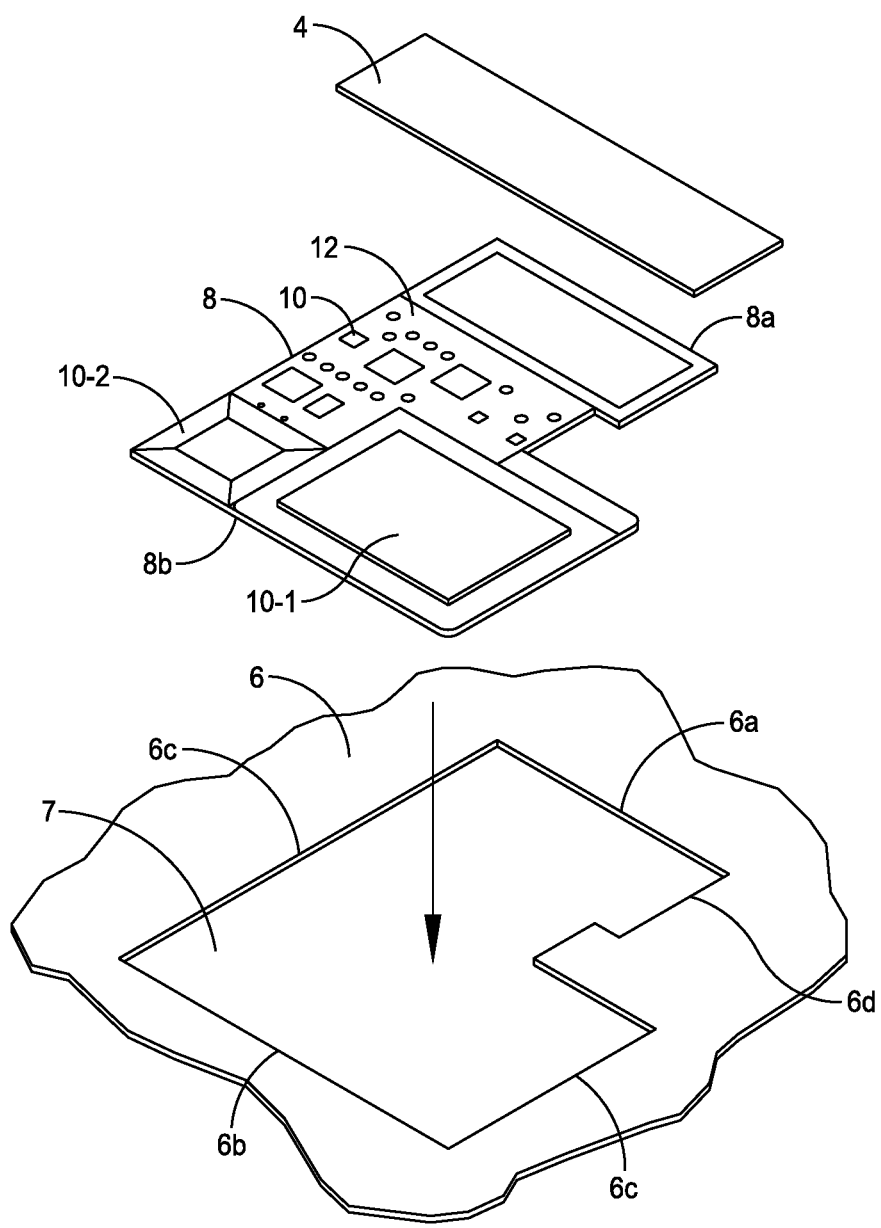
FIG. 5 is a partial exploded view of FIG. 4.

Referring to FIGS. 4-5, inlay layer 8 is disposed within a respective hole 7 of the first thermoplastic layer 6. The inlay layer 8 is partially or fully disposed within hole 7. Inlay layer 8 comprises at least one active or passive electronic component 10 embedded or surface mounted on a supporting film 12. Inlay layer 8 may comprise a printed circuit board (PCB). Electronic component 10 may be embedded or surface mounted on the PCB supporting material. Examples of supporting film 12 include but are not limited to polyimide, polyester such as PET, glass filled epoxy sheet such as FR-4. A printed circuit board (PCB) having all the components are abbreviated as PCBa. For brevity, the references to PCB in this disclosure will be understood to encompass any PCBs including PCBa. Examples of electronic component 10 inside inlay layer 8 include but are not limited to active or passive electronic components, e.g., an integrated circuit (IC), a battery (10-1) for a "power card," a pushing button (10-2), an antenna, and a functional component such as light emitting diodes (LED). Electronic components are interconnected via wires or traces 14. Supporting film 12 may be a polymer based dielectric material. Inlay layer 8 may have any dimension relative to the size of a hole in first thermoplastic layer 6. Inlay layer 8 may be partially or fully disposed in such a hole. In some embodiments, the size of the hole on first thermoplastic layer 6 is larger than the size of inlay layer 8. Inlay layer 8 may be fully disposed in the hole. In some embodiments, the size of the hole 7 in first thermoplastic layer 6 is substantially the same as or slightly larger than the size of inlay layer 6 of PCB. The shape of the hole often matches with the shape of inlay layer 8. In some embodiments, the size of the at least one hole on first thermoplastic layer 6 is less than the size of inlay layer 8. The size of the at least one hole is substantially the same as or slightly larger than a portion of inlay layer 8 of the PCB. For example, the shape and size of one hole may match with one electronic component 10. Examples of electronic component 10 include but are not limited to a battery or an active or passive electronic component, e.g., an integrated circuit (IC) in inlay layer 8. In one preferred embodiment, the size of the inlay layer is slightly smaller than that of the respective hole 7.

In some embodiments, inlay layer 8 may comprise a piece or a sheet of metal, ceramic, metal containing material, ceramic containing material, wood, and carbon fiber based material, plastic or the like. Examples of suitable materials for this piece or sheet include but are not limited to platinum, copper, tungsten, metallized power containing materials, alumina, silica, and ceramic powder containing materials. This piece or sheet may be in a certain color or weight, having certain visual or other sensational characteristics.

Figure 6:
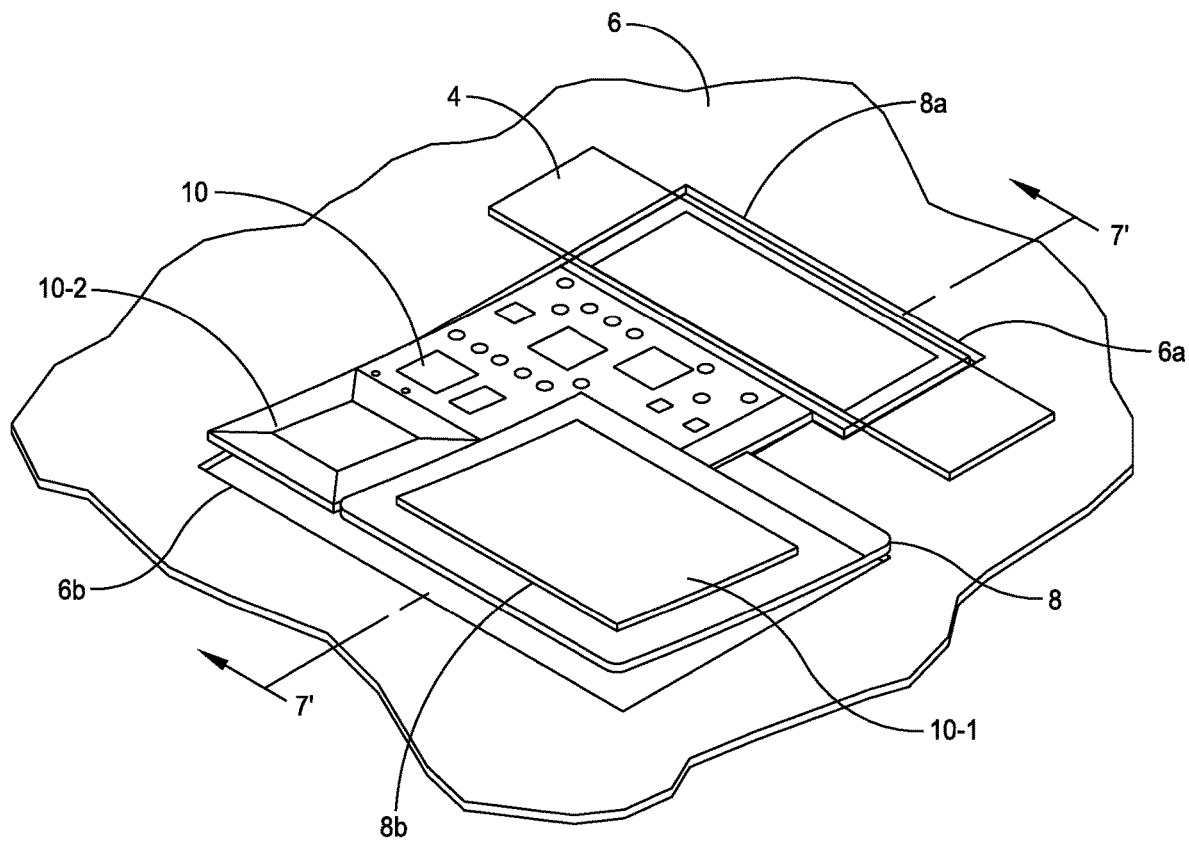
FIG. 6 is a partial elevation view illustrating an inlay layer coupled onto the first thermoplastic layer.

Referring to FIGS. 4-6, at step 36, the at least one inlay layer 8 is coupled to the first thermoplastic layer 6 (e.g., using an adhesive tape 4). Examples of a suitable tape 4 include but not limited to polyimide, polyvinyl chloride (PVC), a copolymer of vinyl chloride, polyolefin, polycarbonate, polyester, polyamide, acrylonitrile butadiene styrene copolymer (ABS), and the like. An instant adhesive, a solder, any other suitable material or method, or the like can be used to couple inlay layer 8 with the first thermoplastic layer 6. Examples of an instant adhesive include but are not limited to cyanoacrylate. Any other suitable chemical or mechanical means can be also used to couple the at least one inlay layer 8 to the first thermoplastic layer 6. In some embodiments, as described in FIGS. 3-6, only a portion 8a of inlay layer 8 is coupled to one internal edge 6a of the first thermoplastic layer 6.

Figure 7:
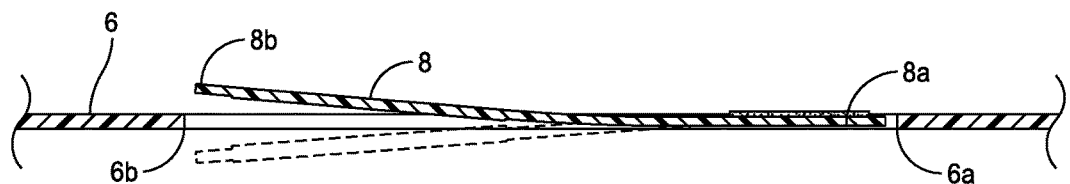
FIG. 7 illustrates a sectional view of the inlay layer and the first thermoplastic layer of FIG. 6.
Figure 8:
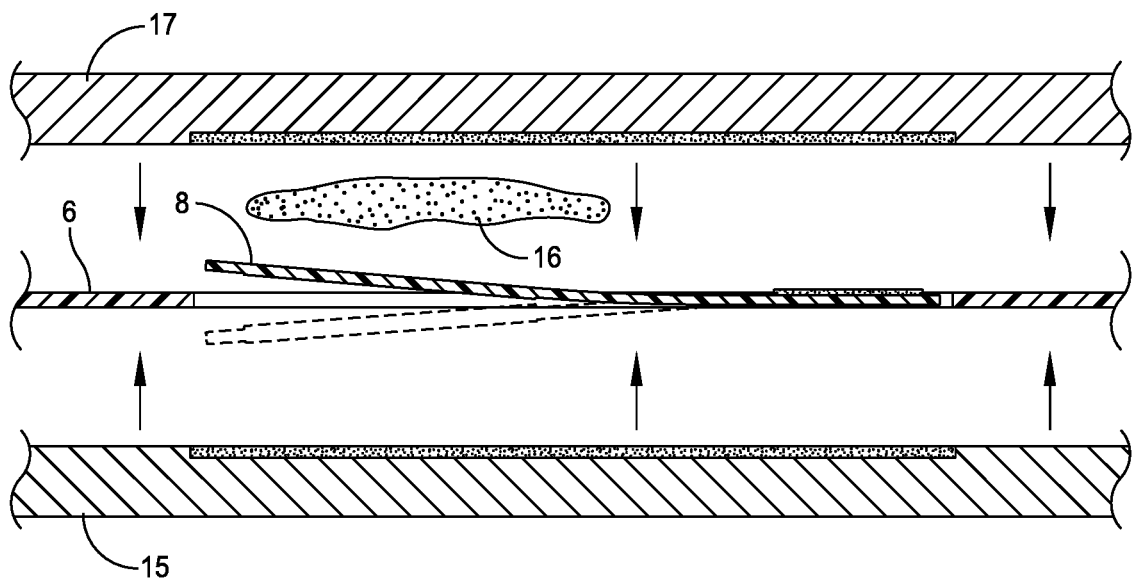
FIG. 8-10 illustrate sectional views of an exemplary core layer having a self-centered inlay layout during a process of fabrication including applying a crosslinkable polymer composition in accordance with some embodiments.
Figure 9:
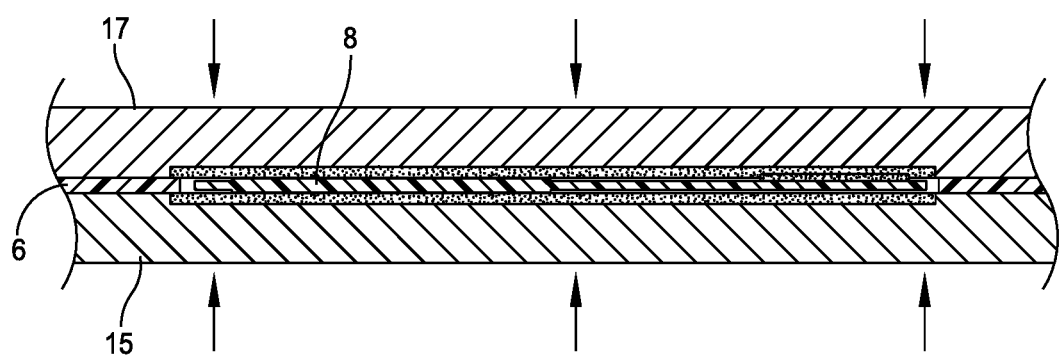
Figure 10:
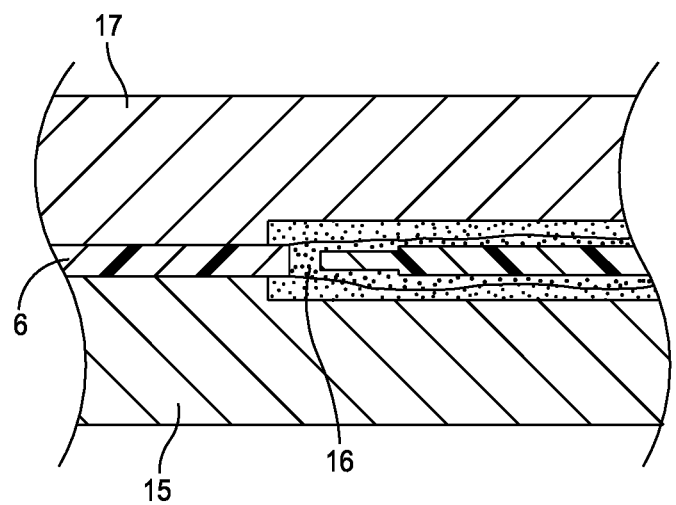
Figure 11:
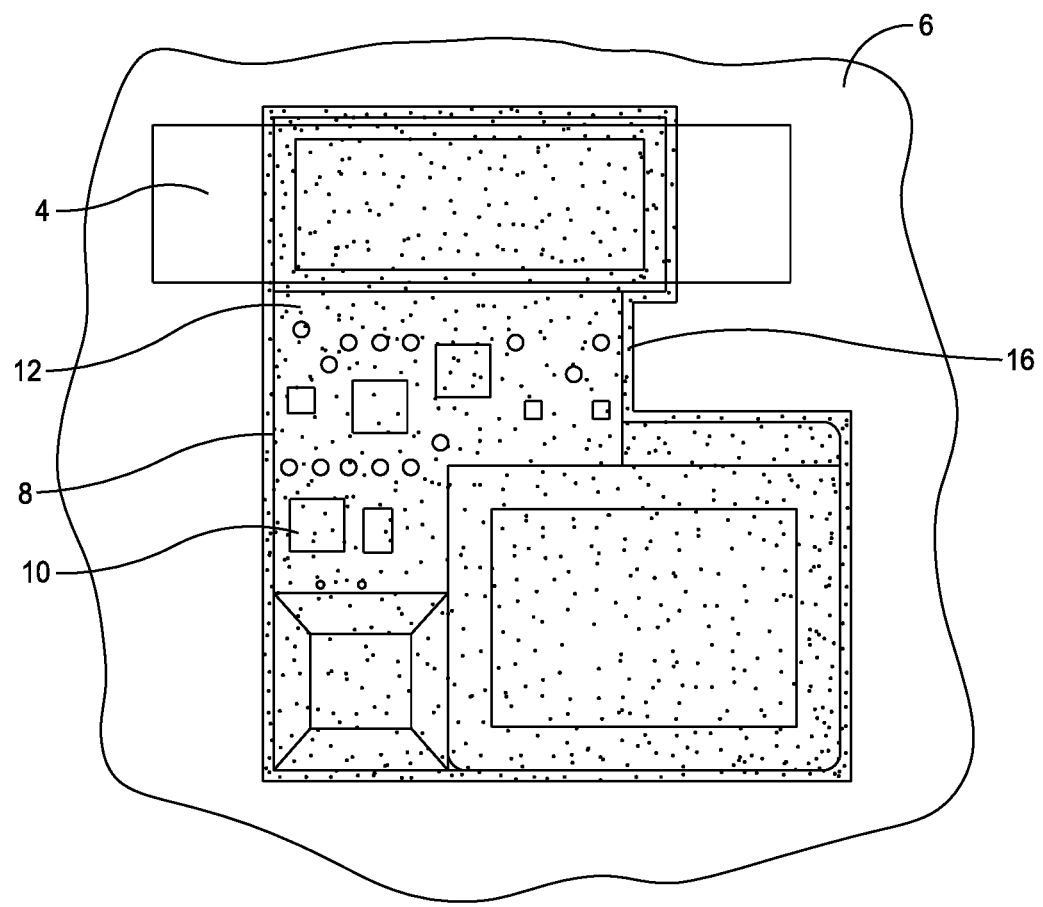
FIG. 11 is a partial plan view of the exemplary core layer of FIGS. 8-10.
Figure 12:
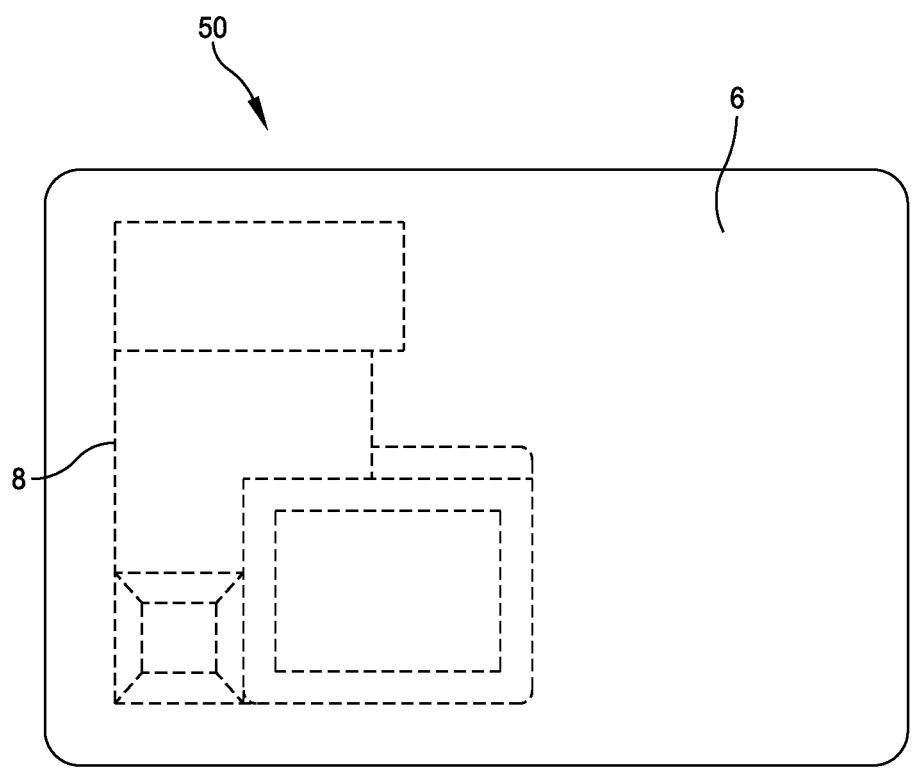
FIG. 12 illustrates a plan view of an exemplary core layer for one information carrying card in accordance with some embodiments.

Referring to FIGS. 7-12, inlay layer 8 is coupled with the first thermoplastic layer 6 so as to form a cantilevered structure inside a respective hole 7 inside the first thermoplastic layer 6, and is configured to be self-centering in the crosslinkable polymer composition 16 during a processing step as described herein, for example, during a step of vacuuming and/or heating. Referring to FIG. 7, the inlay layer 8 is coupled with the first thermoplastic layer 6 on one end 8a, the other end or portion 8b can vibrate or move freely. In this way each, cantilevered inlay 8 is free to move, relative to edges 6b and through a respective hole 7. Referring to FIG. 8, when a crosslinkable composition 16 in the form of liquid or paste is applied over inlay layer 8, with or without using two mold plates 15 and 17, inlay layer 8 moves during the degasing of the composition 16, or during the heating step for curing the composition 16, or both. Thus, inlay layer 8 automatically adjusts its position. This inlay layout 2 provides an efficient way to let the air bubbles in composition 16 out and also level itself to form a flat surface of core layer to be made. Referring to FIG. 12, one area with one inlay layer 8 in a respective hole 7 provides a core layer for one information card. Referring back to FIGS. 1-3, the inlay layout 2 can provide a core layer for a plurality of information carrying cards.

2. Core Layer for Information Carrying Card

Figure 13:
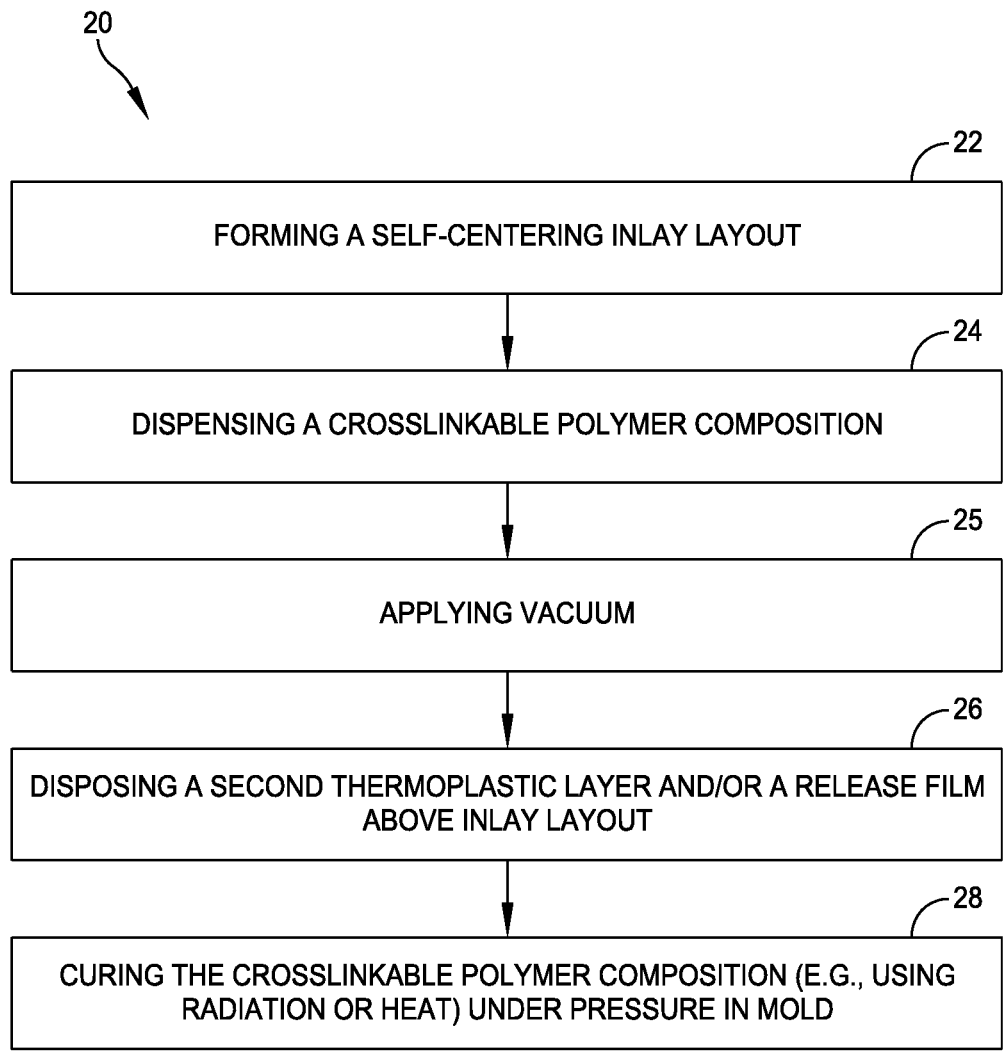
FIG. 13 is a flow chart diagram illustrating an exemplary process of forming a core layer of an information carrying card, wherein the core layer comprises a plurality of inlay layers, in accordance with some embodiments.
Figure 14:
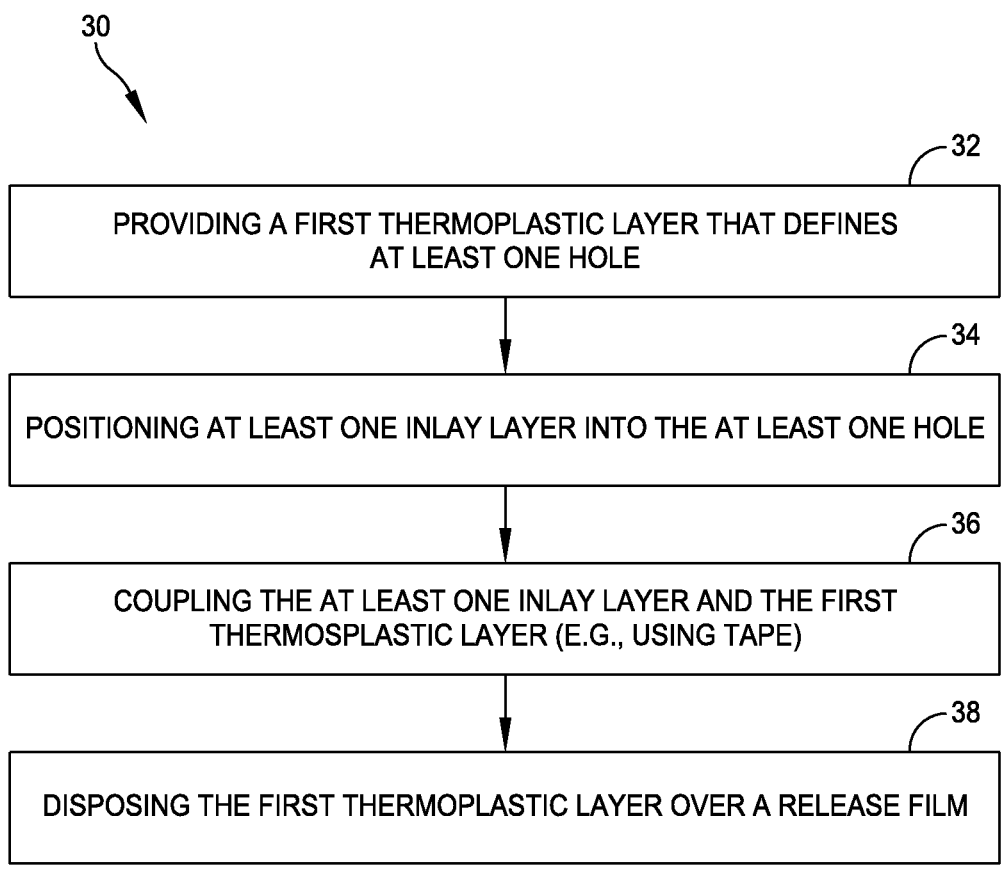
FIG. 14 is a flow chart diagram illustrating an exemplary process for coupling a plurality of inlay layers onto a first thermoplastic layer, in accordance with some embodiments.
Figure 15:
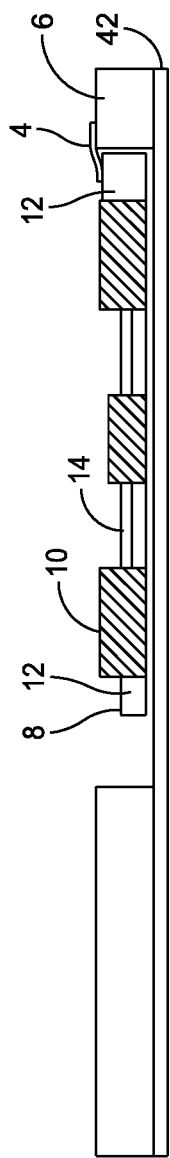
FIGS. 15-18 illustrate partial cross section views of layered structures at different steps in the exemplary process of FIG. 13.
Figure 16:
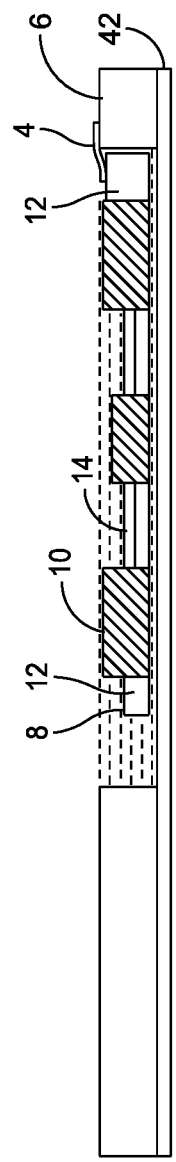
Figure 17:
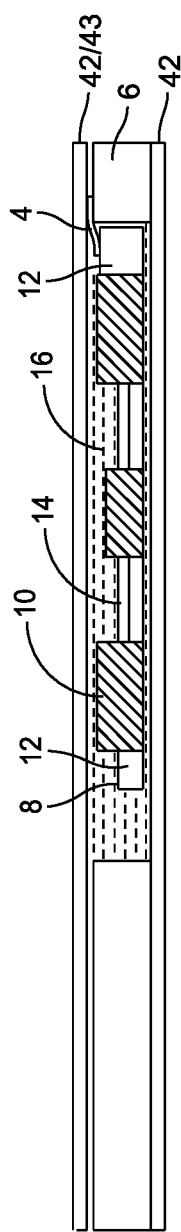

Referring to FIGS. 13-19, an exemplary method 20 forming a core layer for at least one information carrying card in FIG. 13 is described in view of the structures illustrated in FIGS. 15-17. A resulting exemplary core layer 80 is illustrated in FIG. 20. For the purpose of illustration only, FIGS. 15-17 and 20 only are cross section views of a portion of the core layer having one inlay layer for one information carrying card. FIGS. 15-17 and 20 can be interpreted as a core layer having a plurality of inlay layers for a plurality of information carrying cards.

Referring to FIG. 13, in some embodiments, a method for forming a core layer for at least one information carrying card comprises one or more of the steps 22, 24, 25 and 26. At step 22 as described above, an inlay layout 2 comprising at least one inlay layer 8 coupled with a first thermoplastic layer 6 is formed. Referring to FIG. 14, step 22 (such as an exemplary method 30 for forming an inlay layout 2) can comprise one of more of steps 32, 34, and 36. Referring to FIG. 14, method 30 may also comprise step 38, disposing the first thermoplastic layer 6 over a release film 42 (a first release film). FIG. 15 illustrates the structure after an inlay layout 2 is disposed over the first release film 42. The first release film 42 (or any other release film used in other steps in the present disclosure) may be a sheet of polytetrafluoroethylene under the trade name Teflon®, any other fluoropolymer, silicone, a fluoropolymer or silicone coated films. In some embodiments, a breathable release film is preferred. Examples of a breathable release film is a silicone coated paper. For example, release film 42 may take the form of a silicone coated, unbleached parchment baking paper, available from Regency Wraps company under the trade name of "If you care." The one release film is shown for the purpose of illustration only. None or two release films may be used in some embodiments.

Referring back to FIG. 13, at step 24, a crosslinkable polymer composition 16 is dispensed over the inlay layout 2 and contacting the inlay layer 2 so as to form the core layer 80 of the information carrying card 100.

Referring to FIG. 16, the resulting layer is shown, after a cross-linkable polymer composition 16 is dispensed over the first thermoplastic layer 6, and the inlay layer 8 (i.e. the inlay layout 2) inside the hole 7. The crosslinkable polymer composition 16 may be also dispensed over the first thermoplastic layer 6 outside the hole in some embodiments. In some embodiments, the crosslinkable polymer composition 16 is dispensed into the hole 7. The cross-linkable polymer composition 16 may directly contact the electronic components 10 including active or passive electronic components, e.g., an integrated circuit (IC). The amount of cross-linkable polymer composition 16 is predetermined and controlled. Any extra material exceeding the top surface of first thermoplastic layer 6 may be removed. In some embodiments, the curable precursor in the crosslinkable polymer composition 16 is unfilled epoxy or urethane acrylate.

The crosslinkable polymer composition 16 comprises: a curable precursor, which may be selected from the group consisting of acrylate, methacrylate, urethane acrylate, silicone acrylate, epoxy acrylate, methacrylate, silicone, urethane and epoxy. The crosslinkable polymer composition is a liquid or a paste, and curable under heat or radiation, or both.

A cross-linkable polymer composition 16 formed in accordance with the invention often comprises a curable precursor, in a liquid or paste form. Such a curable precursor may be acrylate, methacrylate, urethane acrylate, silicone acrylate, epoxy acrylate, urethane, epoxy, silicone or the like. The crosslinkable polymer composition 16 may be unfilled in some embodiments, and comprises filler or other additives in some other embodiments. The crosslinkable polymer composition 16 may comprise in the range of about 0.5 wt. % to about 80 wt. % of the filler. The filler can be inorganic or organic filler. For example, the filler can be a particulate thermoplastic filler such as polyolefin, polyvinyl chloride (PVC), a copolymer of vinyl chloride and at least another monomer, or a polyester such as polyethylene terephthalate (PET). The at least another monomer in the vinyl chloride co-polymer filler may be vinyl ester, vinyl acetate or vinyl ether in some embodiments. The particulate thermoplastic filler may be a compound or a blend comprising a thermoplastic resin, for example, a compound or a blend comprising PVC.

The curable precursor in the crosslinkable polymer composition 16 may comprise a monomer, an oligomer or pre-polymer having functional groups. The precursor may be cross-linkable under a regular curing conditions including but not limited to heating, radiation such as ultraviolet (UV) light, moisture and other suitable conditions including a dual curing mechanism (such as UV plus heat curing). The curable precursor may be in liquid or paste form. Its viscosity may be in the range of 1-100,000 cps. In some embodiments, the curable precursor is urethane acrylate. These curable precursors are readily available from specialty chemical suppliers. Examples of these suppliers include but are not limited to Dymax Corporation of Torrington, Conn. and Sartomer USA, LLC of Exton, Pa. The curable precursor may be epoxy, which provides flexible or flexiblized epoxy after cured.

In some embodiments, a particulate thermoplastic filler may be used. Examples of a thermoplastic filler include, but are not limited to polyolefin, PVC, polyester, copolymer, terpolymer and the like. A powdered polymer that provides adequate results may be a compound or a blend comprising PVC, or a modified PVC. The particulate thermoplastic filler can be a copolymer of vinyl chloride and at least another monomer, which may be vinyl ester, vinyl acetate or vinyl ether. Examples of such a copolymer are available from Dow Chemical Company under trade name of UCAR', and from BASF of Ludwigshafen, Germany under trade name of Laroflex™. UCAR™ is a copolymer of vinyl chloride and vinyl acetate. The grades include YYNS-3, VYHH and VYHD. Laroflex™ is a copolymer of vinyl chloride and vinyl isobutyl ether. The grades include MP25, MP 35, MP45 and MP60. All of these polymer resins are often supplied in the form of fine powder. Particulate thermoplastic filler might be obtained through suspension or emulsion polymerization of one or more corresponding monomers or, through pulverization of solid plastics. The particulate form can be of any size, by way of example and not limitation. The particles may be in the range of 0.5-200 microns. In some embodiments, the particles are in the range of 1-1000 nm.

Cross-linkable polymer composition 16 may further comprise at least one curative based on general principles of polymer chemistry. Such a cross-linkable polymer composition 16 becomes a solid cross-linked composition 18 after curing. Preferably, such a cross-linked composition 18 is more flexible than the first thermoplastic layer 6 in some embodiments. For example, the cross-linkable composition 16 comprises a first curative for thermal curing and a second curative for radiation curing. During the curing or cross-linking reaction, such a cross-linkable composition transforms into a solid cross-linked polymer composition. Such a cross-linked polymer composition 18 is also known in the art as a "thermosetting" polymer or "thermoset" to distinguish it from a thermoplastic polymer. In some embodiments, the cross-linkable polymer composition is unfilled. In some other embodiment, the cross-linkable polymer composition comprises a range of about 0.5 wt. % to about 80 wt. %, and preferably in the range of about 5 wt. % to about 50 wt. %, of a filler.

Examples of a suitable crosslinkable polymer composition 16 include but are not limited to a formulation comprising a curable precursor such as acrylate or urethane acrylate. Examples of such a formulation include but are not limited to X-685-31-1 and X-685-31-2, available from Dymax Corporation of Torrington, Conn. X-685-31-1 is a formulation comprising isobornyl acrylate, 2-hydroxyethyl methacrylate, 2-hydroxy-3-phenoxypropyl acrylate, t-butyl perbenzoate and a photoinitiator. Its viscosity is 1047 cP. X-685-31-2 is also a formulation comprising isobornyl acrylate, 2-hydroxyethyl methacrylate, 2-hydroxy-3-phenoxypropyl acrylate, t-butyl perbenzoate and a photoinitiator. Its viscosity is 1025 cP. These formulations were dispensed over the inlay layer, and then cured at a raised temperature of less than 150° C. under a pressure of less than 2 MPa. The resulting core layer and resulting information carrying cards were successfully made. These examples are only intended to illustrate embodiments in accordance with the invention, and as such should not be construed as imposing limitations upon the claims.

Cross-linkable polymer composition 16, which is packed in a syringe, can be dispensed using the standard dispensing apparatus or equipment for adhesives, encapsulants, sealants and potting compounds. The amount to cross-linkable composition 16 to be dispensed can be calculated and controlled based on the volume of the hole 7 and the inlay layer 8. The dispensing can be performed by a robot.

Referring to FIG. 13, at step 25, the crosslinkable polymer composition 16 is degased in a vacuum chamber after being dispensed over the first thermoplastic layer 6. The degassing process through vacuum can be done without any cover sheet over the structure of FIG. 16 in some embodiments. At step 25, a vacuum is applied onto the crosslinkable polymer composition 16 in a vacuum chamber. The pressure range is in the range of 10 Pa to 1000 Pa. The vacuum can be maintained for 0.5 to 10 minutes, preferably 1-3 minutes. The vacuum is released in the end of a cycle. One or multiple cycles can be used to achieve a bubble free sample. Such a vacuum process is performed at low temperature, preferably at room temperature.

Optionally, at step 26, as illustrated in FIG. 17, a second release film 42 or a second thermoplastic layer 43 is disposed over the structure of FIG. 16 before the vacuum process. The second release film may be the same as the first release film as described. The second thermoplastic layer 43 comprises a thermoplastic material selected from polyvinyl chloride, copolymer of vinyl chloride, polyolefin, polycarbonate, polyester, polyamide, and acrylonitrile butadiene styrene copolymer (ABS). The second thermoplastic layer 43 might be the same as the first thermoplastic layer 6. Its thickness may be in the range of 0.025 mm to 0.25 mm. This thermoplastic layer 43 becomes a part of the core layer if used. Examples of a polyolefin based film may be TESLIN® product, available from PPG Industries.

At step 28, the crosslinkable polymer composition 16 can be cured to form a crosslinked polymer composition 18. The curing step may be performed under a pressure using radiation or at a raised temperature, or both radiation and heat. Such a pressure may be equal to or less than 2 MPa, and the raised temperature might be equal to or less than 150° C. This curing process can be achieved under pressure through a thermal curing method only. In some other embodiments, curing can be performed through a radiation curing mechanism (e.g., UV curing) only.

Figure 18:
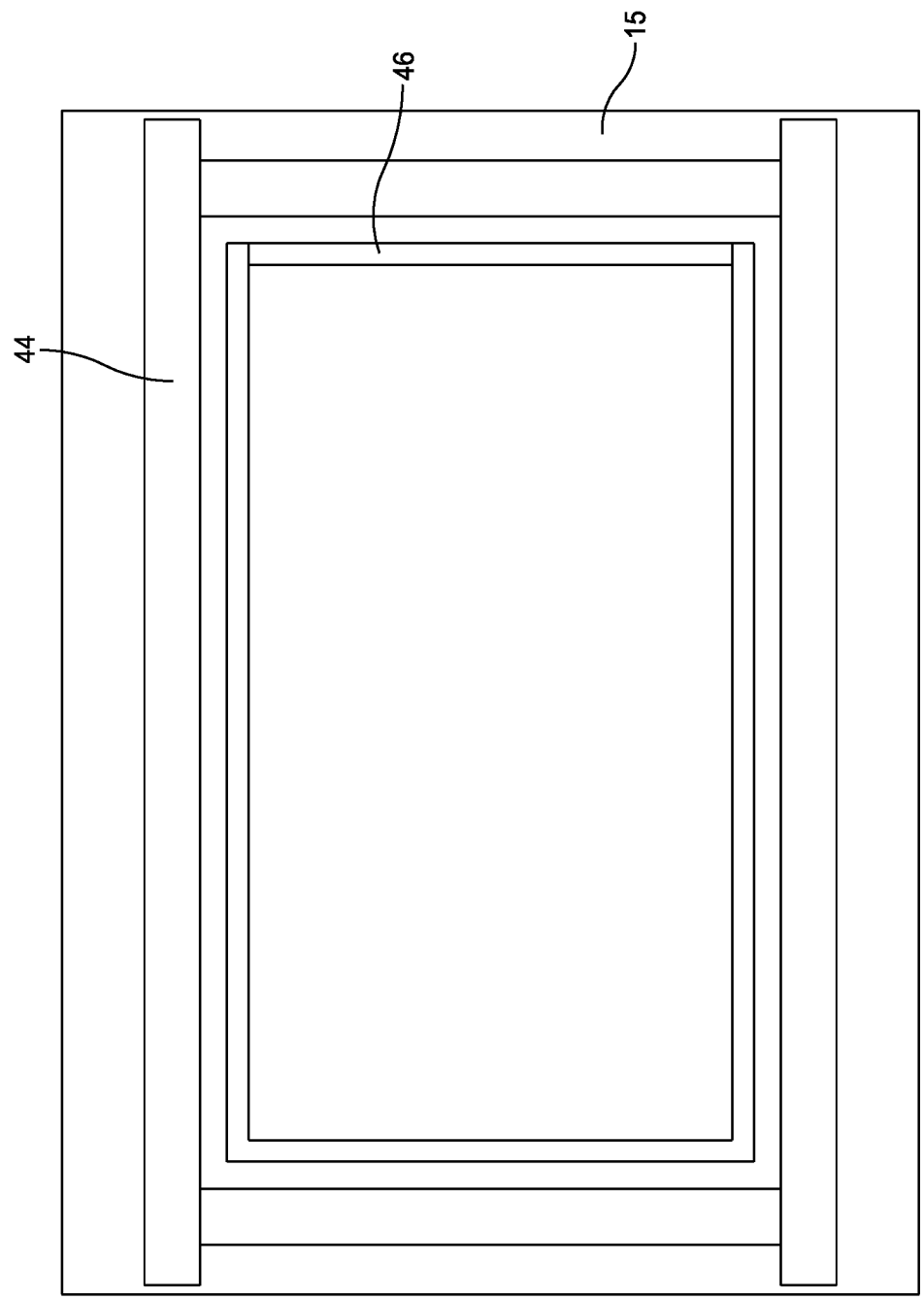

The inlay layout 2 or the layer structure 40 illustrated in FIG. 17 can be disposed into a mold for curing. Referring to FIG. 18, an exemplary mold plate for either a bottom plate 15 or a top plate 17 is illustrated. One of the bottom plate 15 and the top plate 17 may be flat in some embodiments. The exemplary plate 15 in FIG. 18 comprises an outside shim 44 and an inside shim 46 on the base plate of mold plate 15. Both outside shim 44 and inside shim 46 may be a tape adhered onto mold plate 15. Such a tape may be high temperature resistant plastic tape such as a polyimide tape having an adhesive on one side. In some embodiments, the thickness of the outside shim 44 is greater than the thickness of the inside shim 46. Both shims form a "pocket" inside the mold, where the inlay layout 2 or the layer structure 40 illustrated in FIG. 17 is disposed.

Figure 19:
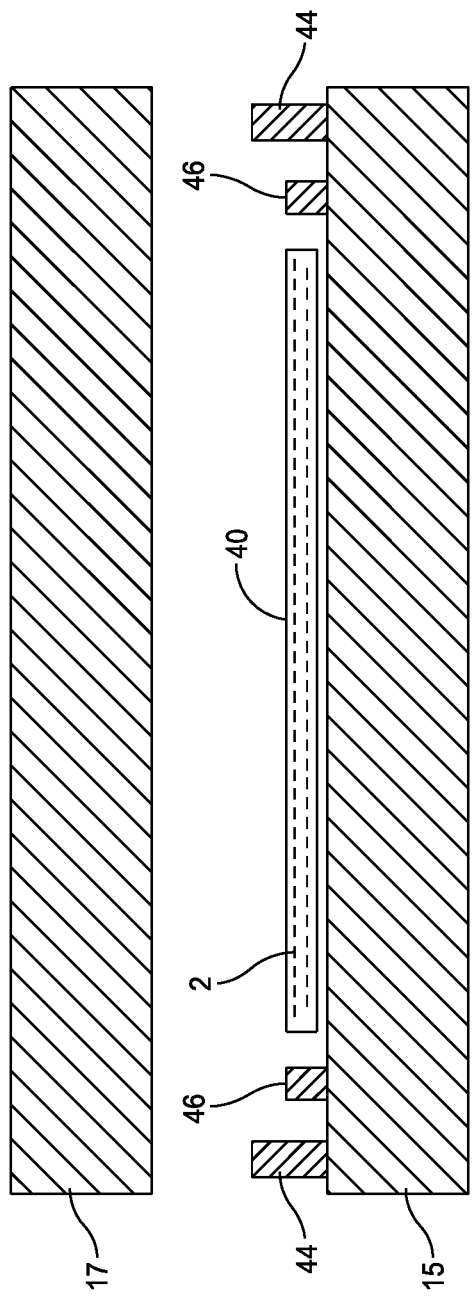
FIG. 19 is an plan view illustrating a mold plate having an outside shim and an inside shim in accordance with some embodiments.
Figure 20:
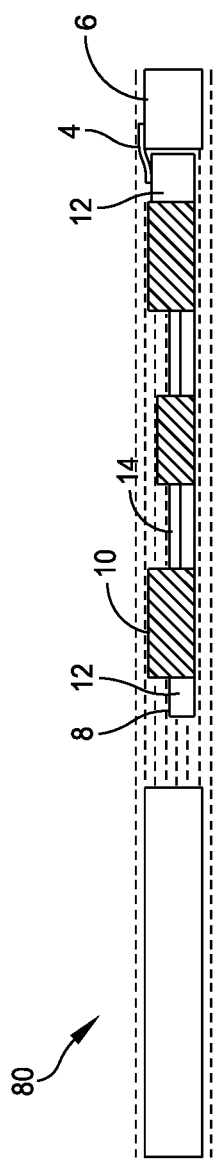
FIG. 20 illustrates a cross section view of an exemplary mold used for forming a core layer for an information carrying card in some embodiments.

FIG. 19 illustrates an exemplary molding set-up. The bottom mold plate comprises shim 44 and shim 46. Shim 46 is thinner than shim 44. Both shims are polyimide tapes. The top mold 17 is flat without a tape in this exemplary set-up. The layer structure 40 comprising inlay layout 2 illustrated in FIG. 17 is disposed inside the mold. At an exemplary step 38, the layered structure 40 is heated under pressure. A suitable temperature would be one that is sufficiently high to partially or fully cure the cross-linkable polymer composition 16, or hot laminating first thermoplastic film 6, or both. After the heat treatment, the cross-linkable polymer composition 16 forms a solid. Such a cross-linked polymer composition 18 has good adhesion with first thermoplastic layer 6 and inlay layer 8 including electronic component 10 and supporting film 12. In some embodiments, such a cross-linked composition is more flexible than first thermoplastic film 6. In some embodiments, the temperature is in the range of 65-232° C. In some embodiments, the temperature is less than 150° C.

Both shims described herein are for illustration only. Both shims may be a permanent portion of the mold plates in some other embodiments. Inlay layer 8 in self-centering inlay layout 2 centers itself during the vacuum step 25 and the initial process of the curing step 26. As described herein, inlay layer 8 moves or oscillates relative to the edges of hole 7 and internal edges of the first thermoplastic layer 6. During step 25, air bubbles trapped inside the crosslinkable composition 16 even under inlay layer 8 may easily escape from composition 16. During the initial process of curing, when composition 16 is warmed up, inlay layer 8 can center itself relative to the edges of hole 7 and the first thermoplastic layer 6. When composition 16 is crosslinked and becomes solid crosslinked composition 18, inlay layer may be fixed after self-centered. The at least one inlay layer 8 remains self-centering during processing and becomes self-centered after the curing step, horizontally and/or vertically relative to the edges of the hole 7, the first thermoplastic layer 6, or both.

Process 20 may further comprise cooling the layer structure and peeling off the first, second, third and fourth release films. Process 20 may further comprise a step of curing the cross-linkable polymer composition 16 using visible light, UV or other radiation curing. It may also comprise a step of curing via the introduction of moisture or the promotion of other chemical reactions. After process 20, the cross-linkable polymer composition 16 is cured so as to yield a solid. After the release films are peeled away, a core layer for an information carrying card is formed. The core layer comprises a first thermoplastic layer 6, an inlay layer 8 and a cross-linked polymer composition 18. The crosslinkable polymer composition 16 becomes into the crosslinked polymer composition 18 in solid state. Different reference numerals are used for the purpose of differentiation only even though they may share the same chemical composition. The exemplary core layer 80 for an information carrying card from process 20 is illustrate in FIG. 20.

Referring to FIG. 80, an exemplary core layer 80 of an information carry card, is fabricated according to the structure depicted FIGS. 1-3, 16-17 and steps of FIGS. 13 and 14. More particularly, the exemplar core layer 80 comprises a first thermoplastic layer 6, an inlay layer 8, and a cross-linked polymer composition 18. First thermoplastic layer 6 is polyvinyl chloride (PVC), a copolymer of vinyl chloride, polyolefin, polycarbonate, polyester, polyamide, acrylonitrile butadiene styrene copolymer (ABS), or the like. Cross-linked polymer composition 18 is formed from a cross-linkable composition 16 as described in related sections above. Inlay layer 8 comprises electronic components 10, for example, at least one printed circuit board (PCB), supporting film 12 and interconnects 14. The electronic components, such as a battery and an active or passive electronic components 10, are connected with interconnects 14. Electronic components 10 are embedded on supporting film 14. The cross-linked polymer composition 18 fills the voids and remaining spaces inside the hole on first thermoplastic layer 6 and inlay layer 8. In some embodiments, the cross-linked polymer composition 18 directly contacts the outer surface of electronic components 10. Inlay layer 8 may have any dimension relative to the size of a hole in the first thermoplastic layer 6. Inlay layer 8 may be partially or fully disposed into such a hole.

As shown in FIG. 20, in some embodiments, the cross-linked polymer composition 18 from the crosslinkable polymer composition 16 is disposed above the first thermoplastic layer 6 outside the hole 7, for example, in the range of 1 micron to 100 micron in thickness.

In some embodiments, the first thermoplastic layer 6 defines a plurality of holes 7 therein (or therethrough), the inlay layout 2 comprises a plurality of inlay layers 8 coupled with the first thermoplastic layer 6, and each inlay layer 8 is disposed inside a respective one of the plurality of holes 7. The resulting core layer 80 is for making a plurality of information carrying cards simultaneously.

The present disclosure provides the resulting products, including a core layer. In some embodiments, a core layer 80 for at least one information carrying card comprises at least one thermoplastic layer 6 defining at least one hole 7 therein (or therethrough), an inlay layout 2 comprising at least one inlay layer 8 coupled (e.g., flexibly coupled) with the first thermoplastic layer 6, and a crosslinked polymer composition 18 disposed over the inlay layout 2 and contacting the inlay layer 8. Each inlay layer is at least partially disposed inside a respective hole. As described above, the first thermoplastic layer 6 comprises a thermoplastic material, which may be selected from the group consisting of polyvinyl chloride, copolymer of vinyl chloride, polyolefin, polycarbonate, polyester, polyamide, and acrylonitrile butadiene styrene copolymer (ABS). The at least one inlay layer 8 is coupled with the first thermoplastic layer 6 so as to form a cantilevered structure within a respective hole 7, and is configured to be self-centered in the crosslinked polymer composition 16. The at least one inlay layer comprises at least one electronic component, wherein the at least one electronic component 10 is partially or fully disposed inside the respective hole 7. The at least one electronic component 10 in the inlay layer 8 may comprise at least one integrated circuit, at least one light emitting diode (LED) component, or a battery. The inlay layout 2 or the core layer 80 may comprise at least one of a metal sheet (such as stainless steel), a ceramic sheet, a wooden sheet, and carbon fiber based sheet. The crosslinked polymer composition 18 comprises a base unit selected from the group consisting of acrylate, methacrylate, urethane acrylate, ester acrylate, silicone acrylate, epoxy acrylate, silicone, urethane and epoxy. The base unit in the crosslinked polymer composition 18 comprises urethane acrylate or epoxy in some embodiments. The first thermoplastic layer 6 defines a plurality of holes 7 therein. The inlay layout 2 may comprise a plurality of inlay layers 8 coupled with the first thermoplastic layer 6, each inlay layer 8 is disposed inside a respective hole 7 of the plurality of holes, and the core layer 80 is configured to be used for making a plurality of information carrying cards.

3. Information Carrying Card

In some embodiments, the invention also provides a method for fabricating an information carrying card. The method comprises forming a core layer as described above. Such a method for making information carrying card may comprise laminating a printable thermoplastic film on one side of the core layer. A printable thermoplastic film may be laminated on each side of the core layer. Such a method may further comprise laminating a transparent thermoplastic film on the printable thermoplastic film on one side of the core layer. A transparent thermoplastic film may be laminated on the printable thermoplastic film on each side of the core layer.

In some embodiments, an information carrying card comprises a core layer as described above. In some embodiments, the information carrying card further comprises at least one printable thermoplastic film laminated onto the surface of the core layer. The information carrying card further comprises at least one transparent film laminated onto the surface of the printable thermoplastic film in some embodiments. The information carrying card further comprises at least one battery interconnected with the at least one electronic component in the inlay layer in some embodiments. The information carrying card may also comprise at least one sheet of metal, ceramic, metal containing material, ceramic containing material, wood, carbon fiber based material, plastics or the like.

Figure 21:
FIGS. 21-26 illustrate cross section views of the layer structure at different steps of an exemplary process of making an exemplary information carrying card, in accordance with some embodiments.
Figure 22:
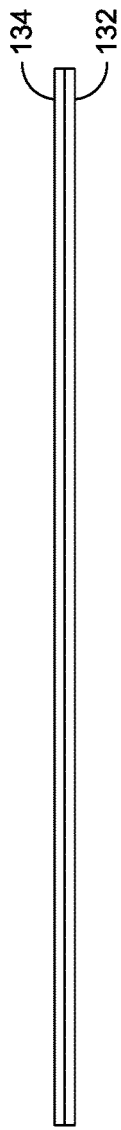
Figure 25:
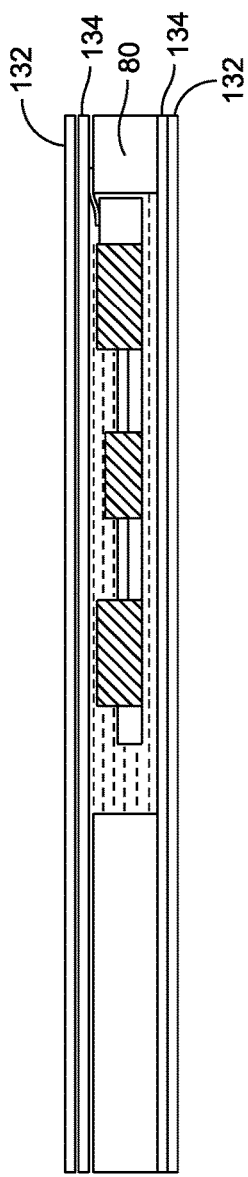
Figure 26:
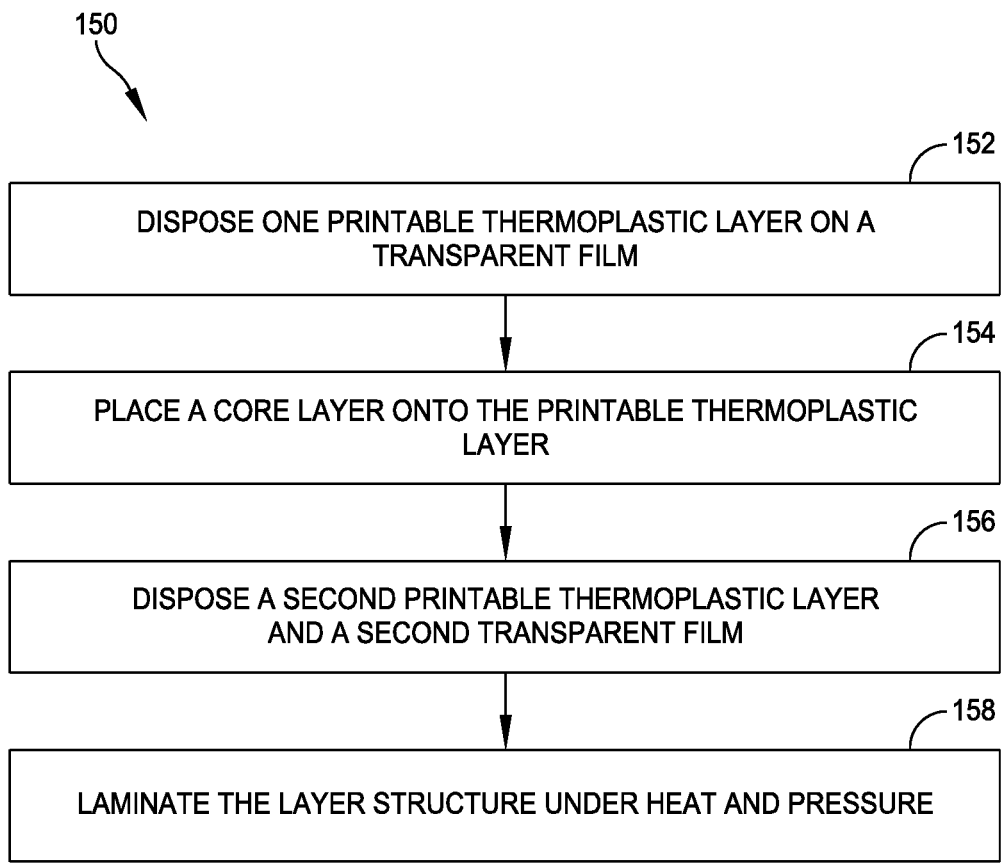

Referring to FIGS. 21-26, exemplary process 150 of making an exemplary information carrying card includes the following steps as shown in FIG. 26. The layer structure at different steps of an exemplary process 150 is shown in FIGS. 21-25. Referring to FIG. 21, a transparent film 132 is provided first. A transparent film 132 can be used as the outer layer of an information carrying card. Examples of transparent film 132 include but are not limited to PVC and PET. In step 152 of FIG. 26, referring to the structure shown in FIG. 22, a printable thermoplastic film layer 134 is disposed onto the transparent film 132. The printable thermoplastic film 134 is an imaging receiving layer. Words or images can be printed onto the printable thermoplastic film 134 before or during a process of making an information card. In some embodiments, this film is not transparent, and contains some pigments such as white pigments.

Figure 23:
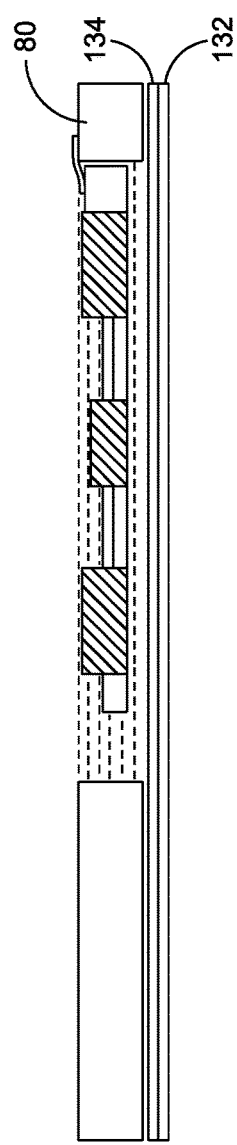
Figure 24:
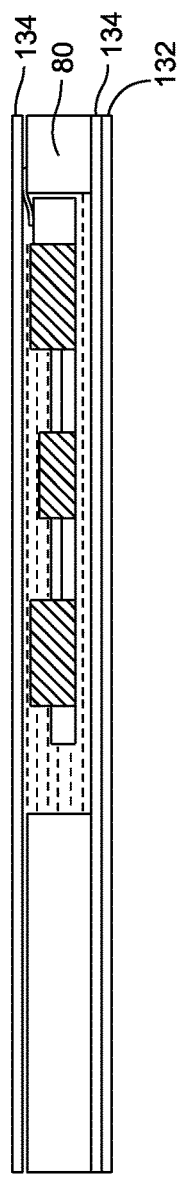

In step 154 of FIG. 26, a core layer 80 is disposed onto the printable thermoplastic layer 134 and the transparent film 132. One resulting exemplary layer structure is shown in FIG. 23. Referring again to FIG. 20, in some embodiments, an exemplary core layer 80 comprises a first thermoplastic layer 6, an inlay layer 8, and a cross-linked polymer composition 18. Inlay layer 8 comprises electronic components 10, for example, at least one printed circuit board (PCB), supporting film 12 and interconnects 14. The electronic components, such as a battery and an active or passive electronic components 10, are connected with interconnects 14. Electronic components 10 are embedded or surface-mounted on supporting film 12. Cross-linked polymer composition 16 fills the voids and remaining spaces inside the hole on first thermoplastic layer 6 and inlay layer 8. In some embodiments, cross-linked polymer composition 18 directly contacts the outer surface of electronic components 10.

In step 156 (FIG. 26), a second printable thermoplastic layer 134 is disposed onto the layered structure of FIG. 23, followed by a second transparent film 132. The exemplary resulting layer structures are shown in FIG. 34 and FIG. 25. In some embodiments, at least one release film is used on each side of the layer structure of FIG. 25. Examples of the release film include a sheet of polytetrafluoroethylene, any other fluoropolymer, silicone, a fluoropolymer or silicone coated films. In some embodiments, a breathable release film is used.

In step 158 (FIG. 26), the exemplary layer structure after step 156 is laminated under a pressure at a raised temperature. The layered structure after step 156 is pressed under a pressure. In some embodiments, the pressure is less than 2 MPa. The layered sandwich structure is then is heated at a raised temperature under the pressure. A suitable temperature is sufficiently high so that all the films are laminated with good adhesion. In some embodiments, the temperature is in the range of 65-232° C. In some embodiments, the temperature is less than 150° C. The information carrying card may have different sizes. In some embodiments, the information card may have a size following ISO/IEC 7810 standard. For example, an ID-1 type smart card, which is for most of the banking card and ID cards, has a size of 85.6×53.98 mm.

In some embodiments, the exemplary process 150 comprises a process such as surface treatment to improve adhesion between two layers. Examples of surface treatment methods include but are not limited to plasma treatment or corona treatment before hot lamination at step 158.

The exemplary processes 20 and 150 can be used to make a plurality of information carrying cards on one sheet simultaneously, in accordance with some embodiments. An exemplary core layer structure 80 comprising a plurality of inlay layer 8 can be fabricated using process as described above. Cross-linked polymer composition 18 fills the voids and remaining spaces inside the hole on first thermoplastic layer 6 and inlay layer 8. In some embodiments, cross-linked polymer composition 18 directly contacts the outer surface of electronic components 10. Referring again to FIG. 13, a crosslinkable polymer composition 16 is disposed over the inlay layer inside each hole to form the crosslinked polymer composition 18. An exemplary crosslinkable composition comprises a curable precursor with or without fillers. The curable precursor is urethane acrylate, ester acrylate, silicone acrylate, epoxy acrylate, acrylates including methacrylate, silicone, urethane, epoxy or the like. The crosslinkable composition 16 is cured to form a crosslinked composition 18. Examples of curing method include but are not limited to thermal and radiation curing. In some embodiments, thermal curing occurs during a thermal lamination process. In some embodiments, the exemplary core layer structure 80 is further laminated with at least one printable thermoplastic layer and a transparent film. The resulting laminated structure is then cut to form a plurality of information carrying cards. In some embodiments, the pressure is preferably less than 2 MPa. The temperature is in the range of 65-232° C. in some embodiments, and is preferably less than 150° C. in some embodiments in the lamination process.

Rectangular shaped information carrying cards or smart cards in this disclosure are for illustration only. The disclosure structure and process of making also apply to any information carrying card or part of any shapes and any size. Examples of these parts include but are not limited to rectangular sheets, circular sheets, strips, rods and rings. The size includes but is not limited to any size following ISO/IEC 7810 standard.

Although the subject matter has been described in terms of exemplary embodiments, it is not limited thereto. Rather, the appended claims should be construed broadly, to include other variants and embodiments, which may be made by those skilled in the art.

What is claimed is:

1. A method for forming a core layer for at least one information carrying card, comprising:
    arranging a portion of at least one inlay layer with a first thermoplastic layer to provide an inlay layout, wherein the first thermoplastic layer comprises a thermoplastic material and defines a hole therein,
    cantilevering the at least one inlay layer with the first thermoplastic layer so as to provide a cantilever inlay within the hole, wherein the at least one inlay layer is coupled with an edge of the first thermoplastic layer defining the hole; and
    dispensing a crosslinkable polymer composition over the inlay layout and contacting the inlay layer so as to form the core layer of the information carrying card, wherein the cantilever inlay is configured to be movable above and below the edge of the first thermoplastic layer and pass freely through the hole in the presence of the crosslinkable polymer composition.

2. The method of claim 1 wherein the step of forming the inlay layout comprises:
    providing the first thermoplastic layer;
    forming a cantilever projection on an edge of the at least one inlay layer so as to couple the at least one inlay layer and the first thermoplastic layer so that the at least one inlay layer is free to move relative to the hole.

3. The method of claim 1 further comprising:
    disposing the first thermoplastic layer over a first release film.

4. The method of claim 1 further comprising
    disposing a second thermoplastic layer or a second release film above the inlay layout after dispensing the crosslinkable polymer composition.

5. The method of claim 4 wherein the first or second thermoplastic layer comprises a thermoplastic material selected from the group consisting of polyvinyl chloride, copolymer of vinyl chloride, polyolefin, polycarbonate, polyester, polyamide, and acrylonitrile butadiene styrene copolymer (ABS).

6. The method of claim 1, wherein the crosslinkable polymer composition comprises:
    a curable precursor, the curable precursor selected from the group consisting of acrylate, methacrylate, urethane acrylate, silicone acrylate, epoxy acrylate, methacrylate, silicone, urethane and epoxy, and
    the crosslinkable polymer composition is a liquid or a paste.

7. The method of claim 1 wherein the at least one inlay layer comprises at least one electronic component, wherein the at least one electronic component is partially or fully disposed inside the respective hole.

8. The method of claim 7 wherein the at least one electronic component in the inlay layer comprises at least one integrated circuit.

9. The method of claim 7 wherein the at least one electronic component in the inlay layer comprises at least one light emitting diode (LED) component or a battery.

10. The method of claim 1 wherein the inlay layout comprises a metal sheet.

11. A method for fabricating at least one information carrying card, comprising forming a core layer according to claim 1.

12. The method of claim 11 further comprising laminating a printable thermoplastic film on one side of the core layer.

13. A method of claim 12 wherein a metal sheet is laminated on at least one side of each core layer.

14. A core layer for at least one information carrying card comprising:
    a first at least one thermoplastic layer defining at least one hole therein; the first thermoplastic layer comprising a thermoplastic material;
    an inlay layout comprising an inlay layer cantilevered to a portion of a first thermoplastic layer so as to provide a cantilever inlay within the at least one hole, wherein the inlay layer is coupled with an edge of the first thermoplastic layer defining the hole; and
    a crosslinked polymer composition disposed over the inlay layout and contacting the inlay layer,
    the inlay layer is centered in the core layer in a direction of thickness of the core layer, wherein the cantilevered inlay is configured to be movable above and below the edge and pass freely through the at least one hole before the crosslinked polymer composition is introduced or crosslinked.

15. The core layer of claim 14 wherein the thermoplastic material is selected from the group consisting of polyvinyl chloride, copolymer of vinyl chloride, polyolefin, polycarbonate, polyester, polyamide, and acrylonitrile butadiene styrene copolymer (ABS).

16. The core layer of claim 14 wherein the at least one inlay layer is configured to move freely so as to be self-centered in the crosslinked polymer composition.

17. The core layer of claim 14 wherein the at least one inlay layer comprises at least one electronic component, wherein the at least one electronic component is partially or fully disposed inside the respective hole.

18. The core layer of claim 17 wherein the at least one electronic component comprises at least one integrated circuit.

19. The core layer of claim 17 wherein the at least one electronic component comprises at least one light emitting diode (LED) component or a battery.

20. The core layer of claim 14 comprising a metal sheet.

* * * * *